US009753252B2

(12) United States Patent
Tang

(10) Patent No.: US 9,753,252 B2
(45) Date of Patent: Sep. 5, 2017

(54) CAMERA LENS

(71) Applicant: Han Tang, Shenzhen (CN)

(72) Inventor: Han Tang, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 0 days.

(21) Appl. No.: 15/011,471

(22) Filed: Jan. 29, 2016

(65) Prior Publication Data

US 2017/0082832 A1 Mar. 23, 2017

(30) Foreign Application Priority Data

Sep. 17, 2015 (JP) ................................ 2015-184502

(51) Int. Cl.
*G02B 13/00* (2006.01)
*G02B 5/20* (2006.01)

(52) U.S. Cl.
CPC .......... *G02B 13/0035* (2013.01); *G02B 5/208* (2013.01)

(58) Field of Classification Search
CPC .. G02B 13/00; G02B 13/001; G02B 13/0015; G02B 13/002; G02B 13/0035
See application file for complete search history.

(56) References Cited

U.S. PATENT DOCUMENTS

2013/0163098 A1* 6/2013 Lee .................... G02B 13/0035 359/716

* cited by examiner

*Primary Examiner* — Ricky Mack
*Assistant Examiner* — Robert E Tallman
(74) *Attorney, Agent, or Firm* — Na Xu; IPro, PLLC

(57) ABSTRACT

A camera lens is disclosed and includes a first lens with positive refractive power, whose object side surface and image side surface are both aspheric surfaces; an aperture; a second lens with positive refractive power, whose object side surface and image side surface are both aspheric surfaces; and a third lens with negative refractive power, whose object side surface and image side surface are both aspheric surfaces. Specific conditions are satisfied.

5 Claims, 43 Drawing Sheets spherical aberration

Millimeter magnification chromatic difference

Micron,

MFT Performance predicted product quality percentage

CAMERA LENS

FIELD OF THE INVENTION

The present invention relates to a camera lens, particularly relates to a camera lens in which high-pixel CCD, CMOS camera elements are used, such as the mobile phone camera module, WEB camera etc.

DESCRIPTION OF RELATED ART

In recent years, a variety of camera devices equipped with camera elements such as CCD, CMOS and others are extensively popular. Along with the development of miniature and high performance camera elements, the ultrathin and high-luminous flux F (Fno) wide-angle camera lenses with excellent optical properties are needed in society.

The technology related to the camera lens composed of three ultrathin lenses with excellent optical properties is developed gradually. Many inventions are developed, for example, one camera lens is invented at present. It is composed of the first lens with positive refractive power, the second lens with negative refractive power, the third lens with positive refractive power. Such structure can correct most aberration of this optical system, but requirement on production technical is higher and manufacturing cost is higher also.

Therefore, it is necessary to provide a novel camera lens to solve problems mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby is only to explain this disclosure, not intended to limit this disclosure.

Figure 1:
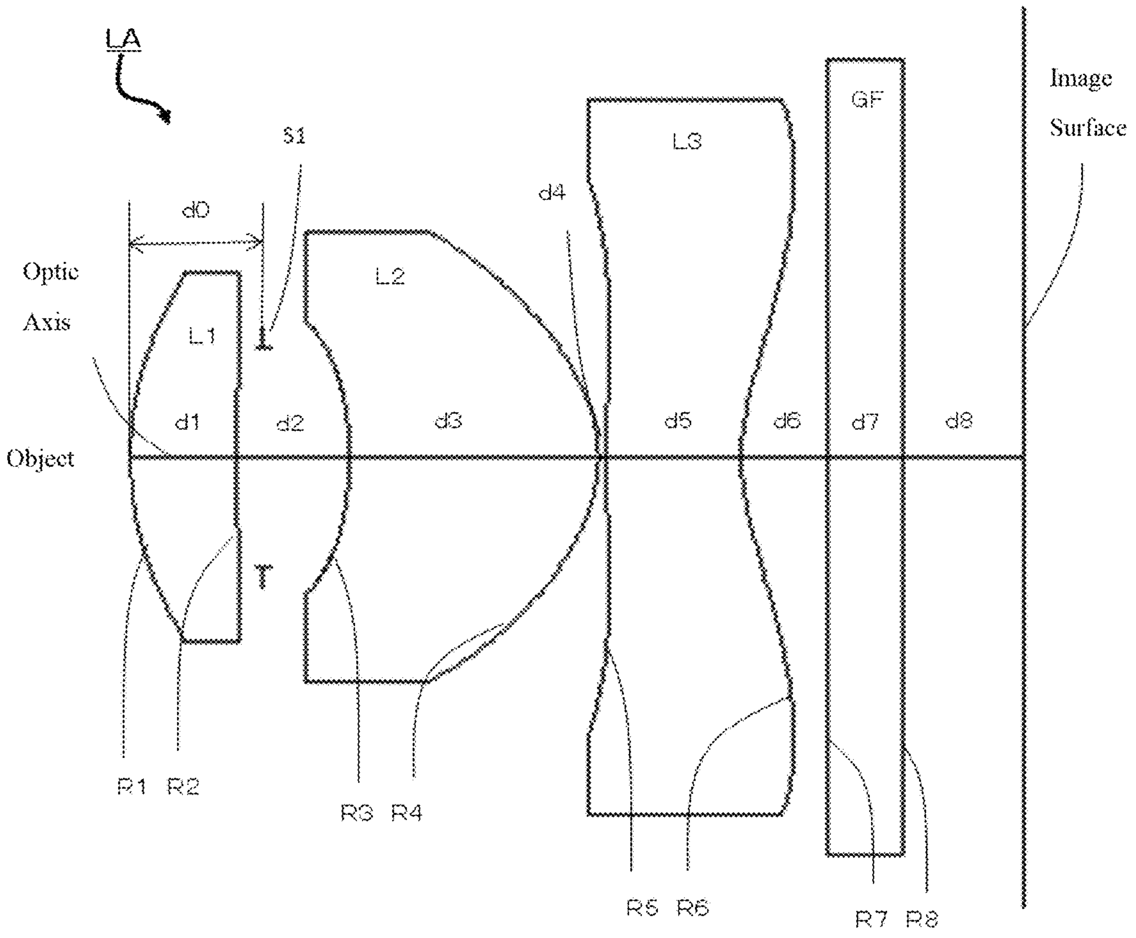
FIG. 1 is a diagram of a camera lens of embodiment 1 of the present invention.

All embodiments of the camera lens of the present invention are explained with the figures. FIG. 1 is the composition diagram of one embodiment of the camera lens of the present invention. The camera lens LA is configured from the object side to the image side in an order as follows: a first lens L1, an aperture S1, a second lens L2 and a third lens L3. A glass plate GF is provided between the third lens L3 and the image side. The glass plate GF has IR cut-off filtering function.

The first lens L1 has positive refracting power; the object side surface is convex and the image side surface is concave. The second lens L2 has positive refracting power, the object side surface is concave and the image side surface is convex. The third lens L3 has negative refracting power, the object side surface is convex and the image side surface is concave. In order to correct aberration issues better, the surface of the first, second and third lenses is aspheric surface.

The camera lens LA satisfies the following specific conditions (1) to (5), $$0.6<f/f1<1.0 \quad (1);$$

$$-1.6<(R1+R2)/(R1-R2)<-1.2 \quad (2);$$

$$0.15<d1/f<0.2 \quad (3);$$

$$-1.5<f/f3<-1 \quad (4);$$

$$1.3<(R5+R6)/(R5-R6)<2.1 \quad (5);$$

wherein, f: The focal distance of the camera lens;

f1: The focal distance of the first lens L1;

R1: The object side curvature radius of the first lens L1;

R2: The image side curvature radius of the first lens L1;

d1: The center thickness of the first lens L1;

f3: The focal distance of the third lens L3;

R5: The object side curvature radius of the third lens L3;

R6: The image side curvature radius of the third lens L3;

The condition (1) specifies the positive refractive power of the first lens L1. When exceeding the lower limit of the condition (1), the positive refractive power of the first lens L1 is too weak, it is difficult to the ultrathin development of camera lens. On the contrary, when exceeding the upper limit, the positive refractive power of the first lens L1 is too strong, it is difficult to correct the aberration and other issues, also not conducive to wide-angle development of the camera lens.

The condition (2) specifies the shape of the first lens L1. If exceeding the limit of the condition (3), along with the wide angle and ultra-thin development of the camera lens, it is more difficult to correct the spherical aberration and other higher aberration issues.

The condition (3) specifies the center thickness of the first lens L1 and the focal distance ratio of the camera lens. If exceeding the limit of the condition (3), it is also not conducive to wide-angle and ultrathin development of the camera lens.

The condition (4) specifies the negative refractive power of the third lens L3. When exceeding the lower limit, the negative refractive power of the third lens L3 is too strong, the higher aberration and the image side surface distortion caused by the axial offset of the third lens L3 will be increased, and the sensitivity of the camera lens will be higher. On the contrary, when exceeding the upper limit, the negative refractive power of the third lens L3 is too weak, it is not conducive to the ultra-thin development of the lens.

The condition (5) specifies the shape of the third lens L3. If exceeding the limit of the condition (6), along with the wide angle and ultra-thin development of the camera lens, it is more difficult to correct the aberration and other issues. The image side surface distortion caused by higher aberration and the axial offset of the third lens L3 will be increased, and the sensitivity of the camera lens will be higher.

In the camera lens disclosed in the present invention, the object side surface of the first lens L1 is convex, thereby, the overall length of the camera lens can be reduced. When the image side surface of the first lens L1 is concave, the aberration of the camera lens can be corrected further, the image quality can be improved then.

The camera lens disclosed in the present invention also satisfies the following conditions (6)-(7).

$$1.0<f/f2<2.0 \quad (6);$$

$$2.2<(R3+R4)/(R3-R4)<2.8 \quad (7)$$

where, f: Overall focal distance of the camera lens;

f2: The focal distance of the second lens L2;

R3: The object side curvature radius of the second lens L2;

R4: The image side curvature radius of the second lens L2;

The condition expression (6) specifies the positive refractive power of the second lens L2. When exceeding the lower limit of the condition (2), the positive refractive power of the second lens L2 will be smaller, it is difficult to correct the axial and abaxial chromatic aberration. On the contrary, when exceeding the upper limit, the positive refractive power of the second lens L2 will be too big, the image side surface distortion of the second lens L2 caused by the axial offset due to higher aberration and other issues will be increased, and the sensitivity of the camera lens will be higher.

The condition expression (7) specifies the shape of the second lens L2. If exceeding the limit of the condition (7), along with the wide angle and ultra-thin development of the camera lens, it is more difficult to correct the axial chromatic aberration.

The camera lens disclosed in the present invention satisfies also following conditions (8)-(9).

$$0.2<d3/f<0.5 \quad (8);$$

$$1.5<d3/d5<3.5 \quad (9);$$

where, f: Overall focal distance of the camera lens;

d3: The center thickness of the second lens L2;

d5: The center thickness of the third lens L3;

The condition (8) specifies the center thickness of the second lens L2 and the focal distance ratio of the camera lens. If exceeding the limit of the condition (8), it is also not conducive to wide-angle and ultrathin development of the camera lens.

The condition (9) specifies the center thickness ratio of the second lens L2 and the third lens L3. If within the limit of the condition (9), it is conducive to the production and shaping of the lens, increases product quality percentage, and reduces production cost. Too thick or too thin lens can be distorted easily and shaped badly.

In the camera lens disclosed in the present invention, the third lens L3 is made of plastic and the production cost is lower, at least there is one inflexion point on the object side surface and image side surface, thereby, the aberration can be corrected further and the image quality can be improved.

The camera lens disclosed in the present invention satisfies also following conditions:

$$10<d2/d4<20 \quad (10);$$

$$2.5<R2/f<4.0 \quad (11)$$

where, d2: The axial distance between the image side of the first lens L1 and the object side of the second lens L2;

d4: The axial distance between the image side of the second lens L2 and the object side of the third lens L3;

R2: The image side curvature radius of the first lens L1;

f: Overall focal distance of the camera lens;

The condition (10) specifies the proportion of the axial distance between the image side of the first lens L1 and the object side of the second lens L2, to the axial distance between the image side of the second lens L2 and the object side of the third lens L3. In the limit of the condition (10), it is conducive to the assembling of the lens, increases product quality percentage and reduces the production cost. Excessive axial distance between two lenses causes easily offset in assembling, reduces assembling quality percentage. Undersized axial distance between two lenses causes easily interference of two lenses in assembling and reduces imaging effect.

The condition (11) specifies the image side curvature radius of the first lens L1 and the ratio of the overall focal distance of the camera lens. Within the limit of the condition (11), it is conducive to the balance between the view angle and total length, enlarges effectively the viewing angle of the camera lens in the present invention, and controls total optical length of the camera lens in the present invention and realizes the miniature and wide angle target.

The camera lens disclosed in the present invention satisfies also following condition expression (12).

$$1.0<v1/v2<1.2 \quad (12);$$

Where, v1: Abbe number of the first lens L1;

v2: Abbe number of the second lens L2;

The condition (12) specifies the ratio of Abbe number of the first lens L1 and the second lens L2. Within the limit of the condition (12), it is conducive to correct the aberration of the cameral lens, increases the imaging quality of the camera lens, reduces the sensitivity of the camera lens on lateral offset and reduces the production costs. When exceeding the lower value of the upper limit condition (12), Abbe number of the second lens L2 is too big, the material price is higher, not conducive to control production cost. On the contrary, when exceeding the upper limit, Abbe number of the second lens L2 is too small, the chromatic dispersion is too big, not conducive to increase the imaging quality of the camera lens. Too big or too small v2 is not conducive to reduce the sensitivity of the camera lens on the lateral offset and tilt of the elements.

As three lens of the camera lens LA have the structure described previously and meet all conditions, the camera lens has excellent optical properties and higher productivity.

The camera lens LA of the present invention is described with the embodiments as follows. The symbols used in all embodiments are as follows. In addition, the unit of the distance, radius and center thickness is mm.

f: Overall focal distance of the camera lens LA;

f1: The focal distance of the first lens L1;

f2: The focal distance of the second lens L2;

f3: The focal distance of the third lens L3;

Fno: F value;

S1: Aperture;

R: The curvature radius of the optical surface is the center curvature radius of lens;

R1: The object side curvature radius of the first lens L1;

R2: The image side curvature radius of the first lens L1;

R3: The object side curvature radius of the second lens L2;

R4: The image side curvature radius of the second lens L2;

R5: The object side curvature radius of the third lens L3;
R6: The image side curvature radius of the third lens L3;
R7: The object side curvature radius of the glass plate GF;
R8: The image side curvature radius of the glass plate GF;
d: The center thickness of lenses and the distance between lenses;
d0: Axial distance between the aperture S1 to the object side surface of the first lens L1;
d1: The center thickness of the first lens L1;
d2: The axial distance between the image side surface of the first lens L1 and the object side surface of the second lens L2;
d3: The center thickness of the second lens L2;
d4: The axial distance between the image side surface of the second lens L2 and the object side surface of the third lens L3;
d5: The center thickness of the third lens L3;
d6: The axial distance between the image side surface of the third lens L3 and the object side surface of the glass plate GF;
d7: The center thickness of the glass plate GF;
d8: The axial distance from the image side to the imaging plane of the glass plate GF;
nd: Refractive power of line d;
n1: Refractive power of line d of the first lens L1;
n2: Refractive power of line d of the second lens L2;
n3: Refractive power of line d of the third lens L3;
n4: Refractive power of line d of glass plate GF;
v d: Abbe number;
v 1: Abbe number of the first lens L1;
V 2: Abbe number of the second lens L2;
v 3: Abbe number of the third lens L3;
v 4: Abbe number of the glass plate GF;
TTL: Optical length (the axial distance from the object side to the image side of the first lens L1);
IH: Image height.

$$y=(x2/R)/[1+\{1-(k+1)(x2/R2)\}1/2]+A4\times4+A6\times6+A8\times8+A10\times10+A12\times12+A14\times14+A16\times16 \quad (13)$$

In which, R is the axial curvature radius; k is the cone constant; A4, A6, A8, A10, A12, A14, A16 are aspherical coefficients.

As a matter of convenience, the aspheric surface of all lenses adopts the aspheric surface in condition (13).

(Embodiment 1)

FIG. 1 is the structural diagram of the camera lens LA in the embodiment 1; The curvature radius of the object side and image, center thickness and the distance d between the lenses, refractive power nd and Abbe number v of the first lens, second lens and third lens of the camera lens LA in the embodiment 1 are shown in table 1. The cone constant k and aspherical coefficient are shown in table 2.

TABLE 1

| | R | | d | | nd | | vd |
|---|---|---|---|---|---|---|---|
| R1 | 1.29802 | d1 = | 0.426 | n1 | 1.509 | v1 | 56.5 |
| R2 | 7.42303 | d2 = | 0.451 | | | | |
| S1 | ∞ | d0 = | −0.533 | | | | |
| R3 | −1.30892 | d3 = | 1.000 | n2 | 1.522 | v2 | 52.2 |
| R4 | −0.58515 | d4 = | 0.030 | | | | |
| R5 | 3.82555 | d5 = | 0.544 | n3 | 1.642 | v3 | 22.4 |
| R6 | 0.79577 | d6 = | 0.350 | | | | |
| R7 | ∞ | d7 = | 0.300 | n4 | 1.523 | v4 | 54.5 |
| R8 | ∞ | d8 = | 0.479 | | | | |

TABLE 2

| | Cone Coefficient | Aspherical Coefficient | | | | | | |
|---|---|---|---|---|---|---|---|---|
| | k | A4 | A6 | A8 | A10 | A12 | A14 | A16 |
| R1 | −1.9437E−01 | 3.6123E−02 | 1.6159E−02 | −1.5570E−01 | 4.1474E−01 | −6.5331E−01 | −7.3450E−01 | 2.5126E−01 |
| R2 | 4.6725E+01 | −5.4978E−02 | 1.2667E−01 | −8.9540E−01 | −2.8189E−01 | 1.3800E+00 | 0.0000E+00 | 0.0000E+00 |
| R3 | 2.9523E+00 | −1.0264E−01 | −5.9218E−01 | 0.0000E+00 | 0.0000E+00 | 0.0000E+00 | 0.0000E+00 | 0.0000E+00 |
| R4 | −1.5928E+00 | 6.7888E−03 | −3.4100E−01 | 1.0625E−01 | 0.0000E+00 | 0.0000E+00 | 0.0000E+00 | 0.0000E+00 |
| R5 | −7.2684E+02 | −2.4131E−02 | −1.6048E−01 | 2.0070E−01 | −9.7202E−02 | 1.5000E−02 | −2.3900E−03 | 7.3000E−04 |
| R6 | −7.5546E+00 | −1.3175E−01 | 7.7275E−02 | −4.2033E−02 | 1.4795E−02 | −2.6492E−03 | −9.7200E−05 | 7.0758E−05 |

The values of the embodiments 1-11 and the corresponding values of the parameters specified in the condition (1)-(12) are listed in table 23.

As shown in table 23, the embodiment 1 meets the condition (1) to (12).

Figure 2:
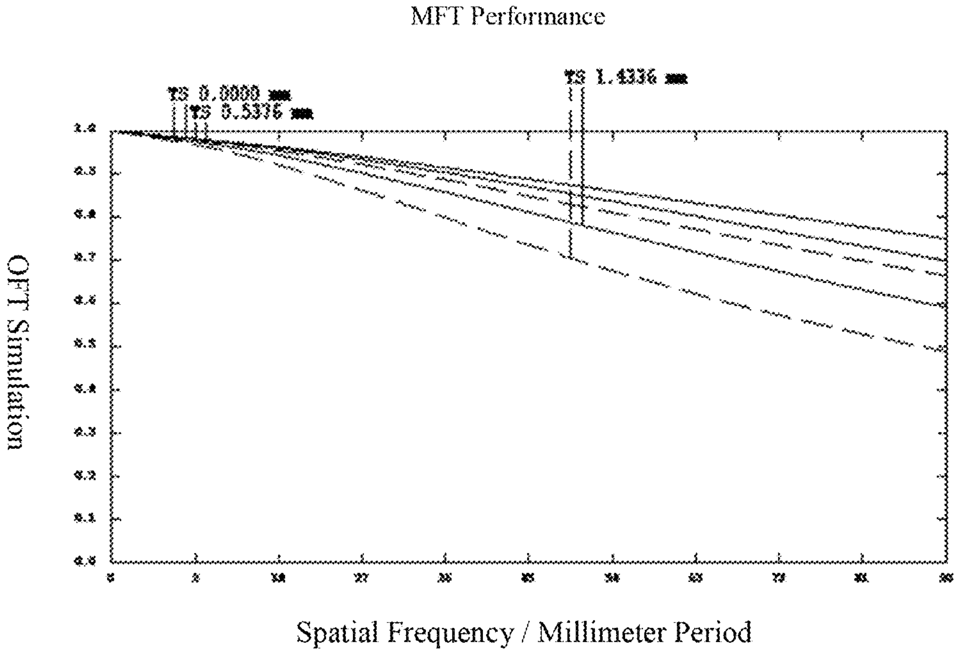
FIG. 2 is an MTF (Modulation Transfer Function) diagram of the camera lens shown in FIG. 1.
Figure 3:
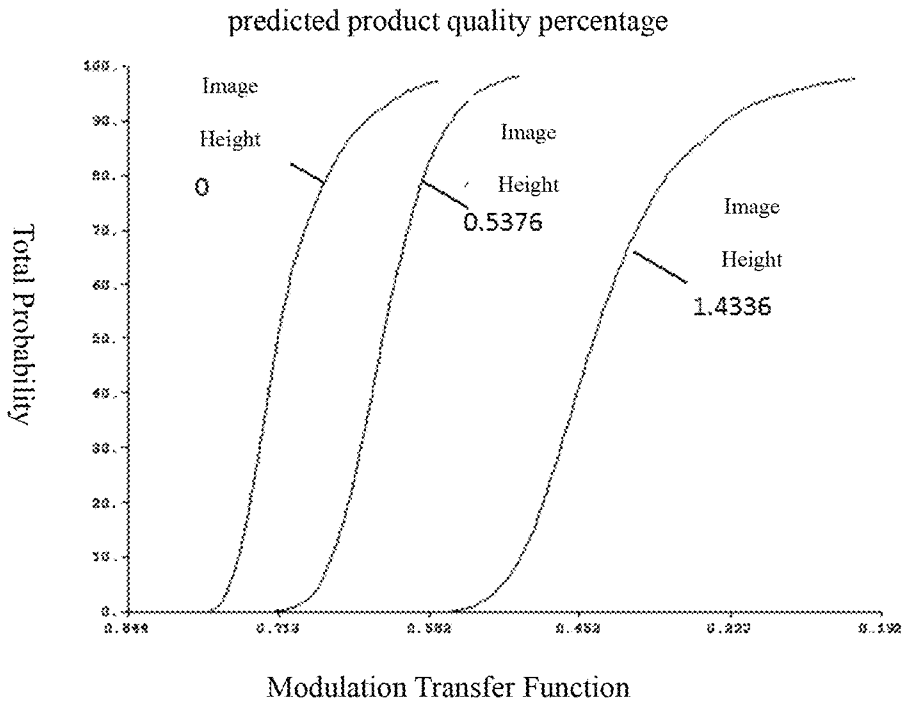
FIG. 3 is the diagram of predicted product quality percentage of the camera lens shown in FIG. 1.
Figure 4:
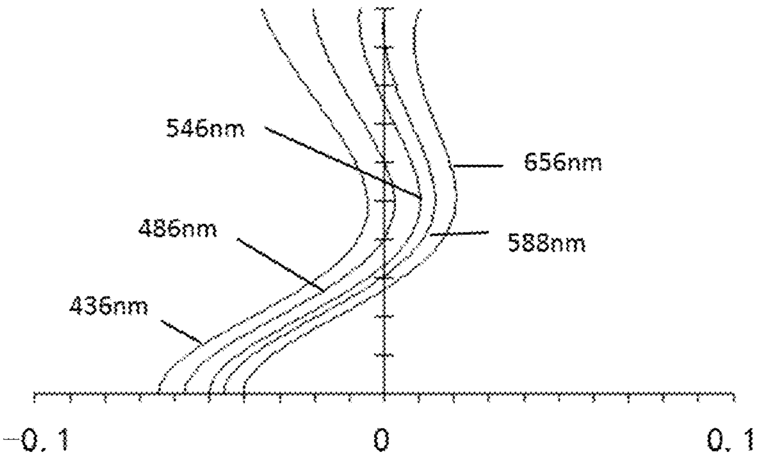
FIG. 4 is the diagram of the spherical aberration (axial chromatic aberration) of the camera lens shown in FIG. 1.
Figure 5:
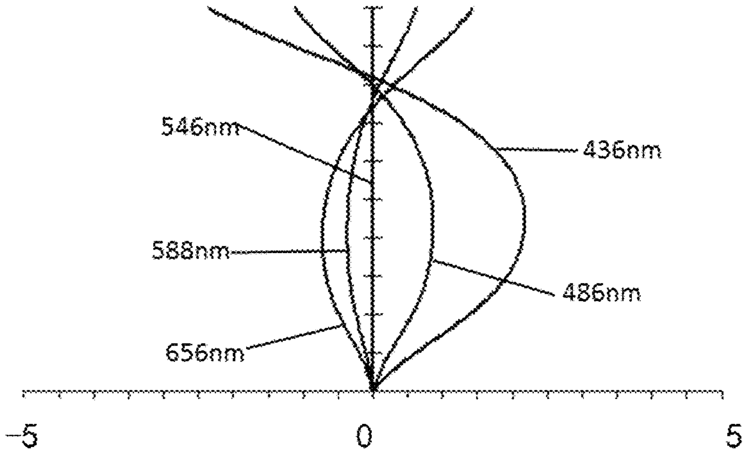
FIG. 5 is the diagram of magnification chromatic difference of the camera lens shown in FIG. 1.
Figure 6:
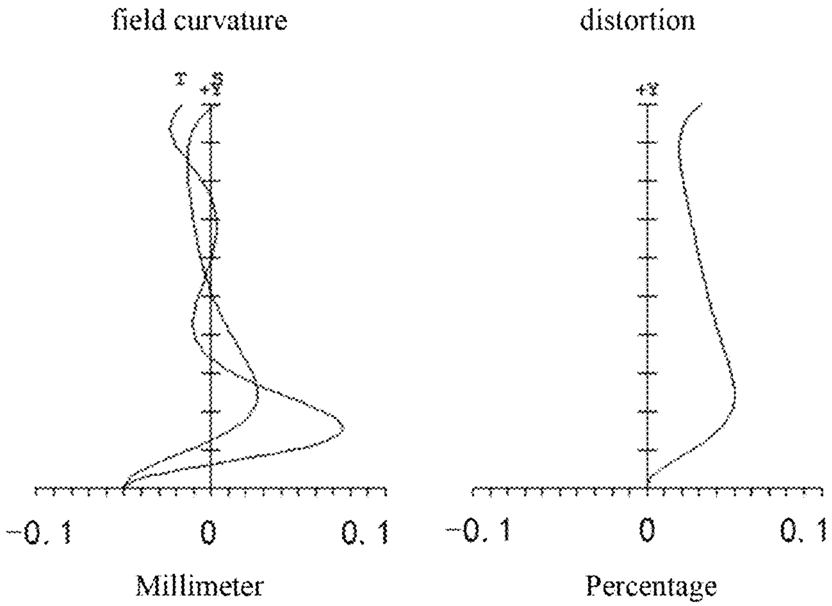
FIG. 6 is the diagram of field curvature and distortion of the camera lens shown in FIG. 1.

FIG. 2 is the MTF diagram of the camera lens LA in the embodiment 1; FIG. 3 is the predicted quality percentage of the camera lens LA in the embodiment 1; FNo of the camera lens LA in the embodiment 1 is 2.18. As shown in drawing 2-6, it is known that excellent optical properties and higher productivity are realized.

(Embodiment 2)

Figure 7:
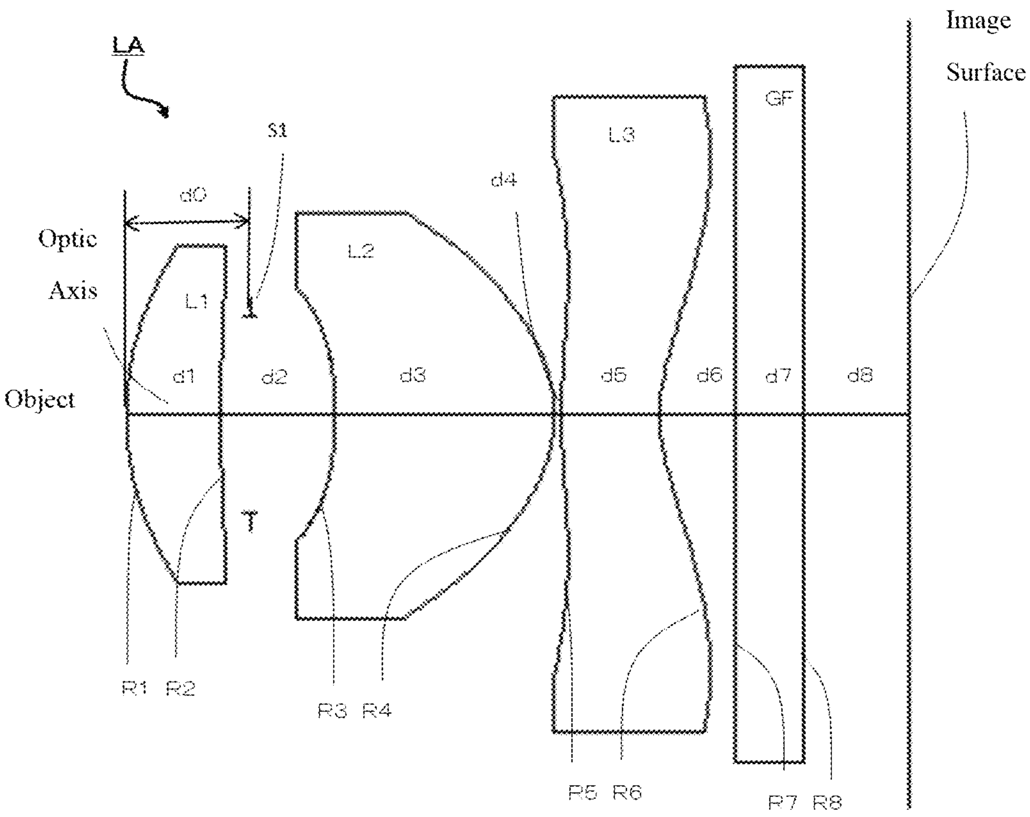
FIG. 7 is the composition diagram of the camera lens in the embodiment 2 of the present invention.

FIG. 7 is the structural diagram of the camera lens LA in the embodiment 2; The curvature radius of the object side and image, center thickness and the distance d between the lenses, refractive power nd and Abbe number v of the first lens, second lens and third lens of the camera lens LA in the embodiment 2 are shown in table 3. The cone constant k and aspherical coefficient are shown in table 4.

TABLE 3

| | R | | d | | nd | | vd |
|---|---|---|---|---|---|---|---|
| R1 | 1.34670 | d1 = | 0.431 | n1 | 1.509 | v1 | 56.5 |
| R2 | 7.29542 | d2 = | 0.134 | | | | |
| S1 | ∞ | d0 = | 0.387 | | | | |
| R3 | −1.47010 | d3 = | 1.000 | n2 | 1.522 | v2 | 52.2 |
| R4 | −0.61195 | d4 = | 0.030 | | | | |
| R5 | 2.47029 | d5 = | 0.446 | n3 | 1.642 | v3 | 22.4 |
| R6 | 0.73213 | d6 = | 0.350 | | | | |
| R7 | ∞ | d7 = | 0.300 | n4 | 1.523 | v4 | 54.5 |
| R8 | ∞ | d8 = | 0.492 | | | | |

TABLE 4

| | Cone Coefficient | Aspherical Coefficient | | | | | | |
|---|---|---|---|---|---|---|---|---|
| | k | A4 | A6 | A8 | A10 | A12 | A14 | A16 |
| R1 | −2.9132E−01 | 2.4644E−02 | −1.4654E−02 | 1.2661E−01 | −2.3966E−01 | −2.7581E−01 | 5.6484E−01 | −5.6526E−01 |
| R2 | 3.5093E+01 | −1.0413E−02 | −1.8609E−01 | 4.5619E−01 | −1.3174E+00 | 2.3528E−01 | 1.7960E+00 | −7.3316E−01 |
| R3 | 1.7278E+00 | −1.9425E−01 | −5.6779E−01 | −1.3950E+00 | 6.3805E+00 | −9.3649E+00 | 6.7591E−01 | −6.9038E−01 |
| R4 | −1.7765E+00 | −1.4386E−01 | 1.5435E−01 | −4.9054E−01 | −2.4654E−01 | 3.1915E−01 | 1.0931E+00 | −9.2411E−01 |
| R5 | −7.9090E+01 | −1.3018E−01 | 1.0755E−01 | −1.5435E−01 | 1.3720E−01 | −4.5135E−02 | 7.4562E−04 | 8.3991E−04 |
| R6 | −6.2859E+00 | −1.5706E−01 | 9.8576E−02 | −5.1696E−02 | 1.7616E−02 | −2.6673E−03 | −2.5036E−04 | 9.1915E−05 |

The values of the embodiments 1-11 and the corresponding values of the parameters specified in the condition (1)-(12) are listed in table 23.

As shown in table 23, the embodiment 2 meets the condition (1) to (12).

Figure 8:
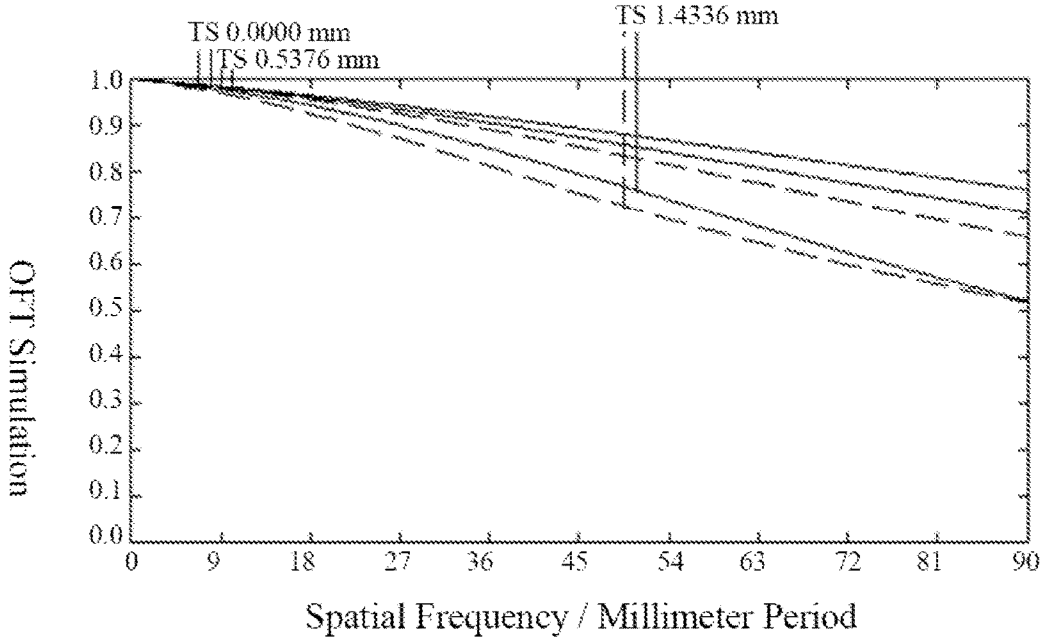
FIG. 8 is an MTF diagram of the camera lens shown in FIG. 7.
Figure 9:
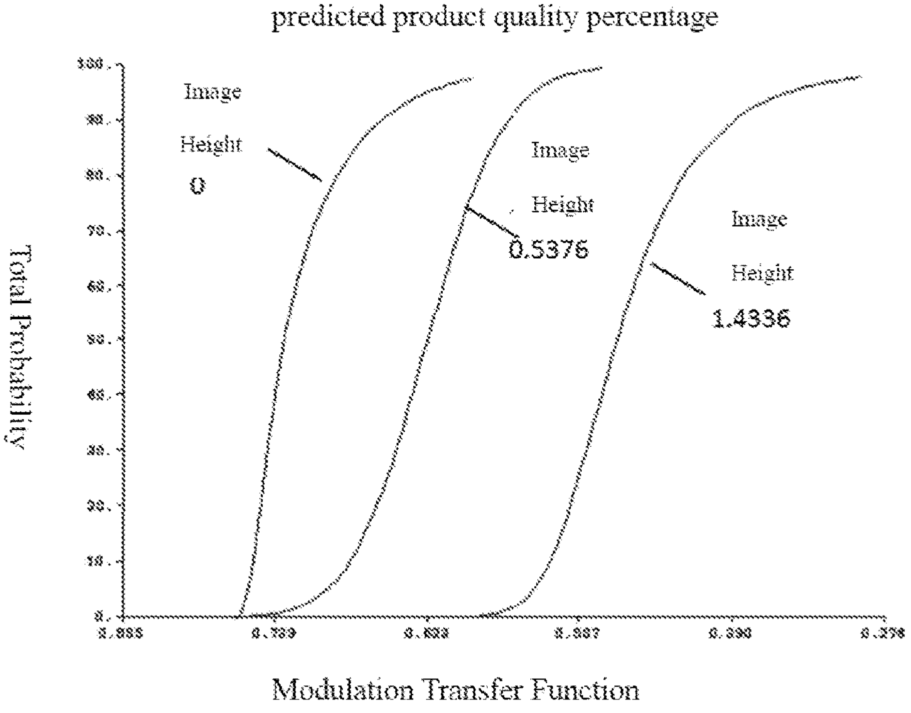
FIG. 9 is the diagram of predicted product quality percentage of the camera lens shown in FIG. 7.
Figure 10:
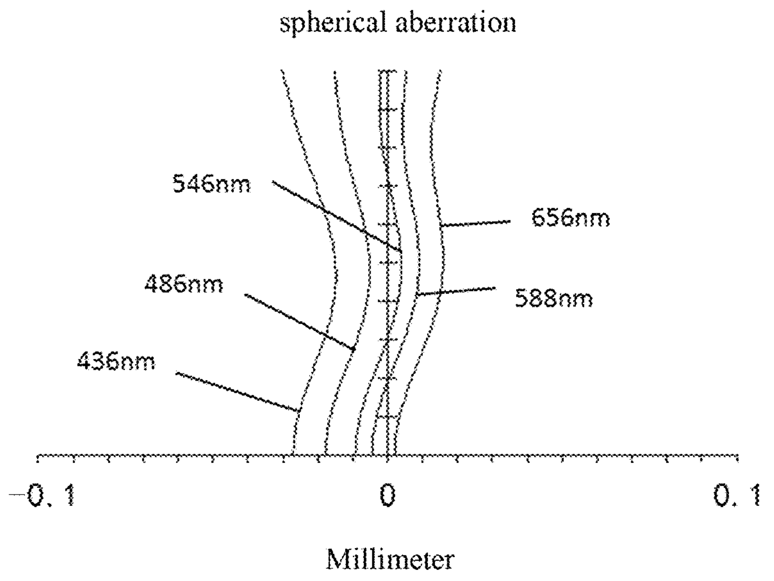
FIG. 10 is the diagram of the spherical aberration (axial chromatic aberration) of the camera lens shown in FIG. 7.
Figure 11:
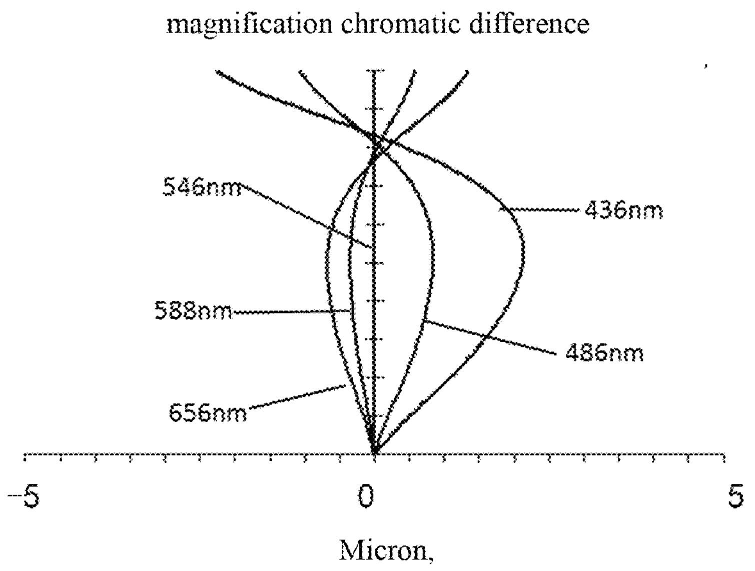
FIG. 11 is the diagram of magnification chromatic difference of the camera lens shown in FIG. 7.
Figure 12:
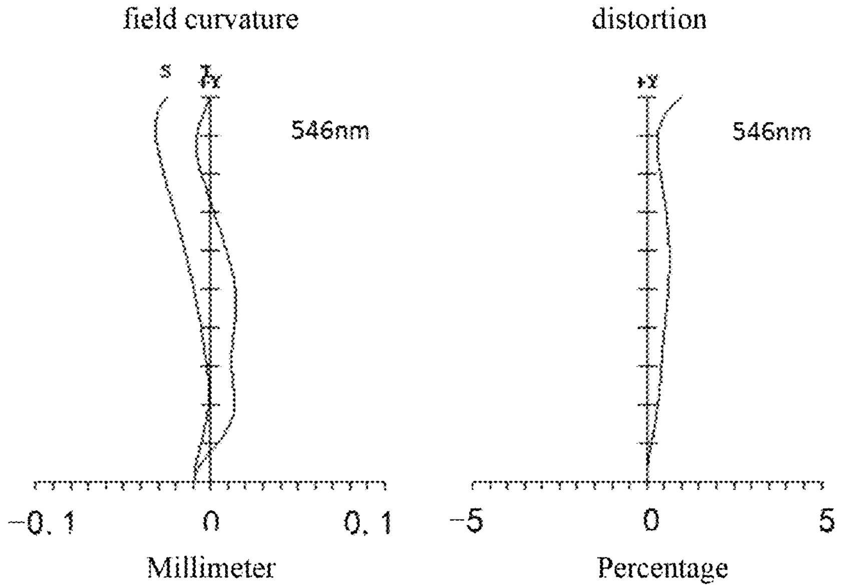
FIG. 12 is the diagram of field curvature and distortion of the camera lens shown in FIG. 7.

FIG. 8 is the MTF diagram of the camera lens LA in the embodiment 2; FIG. 9 is the predicted quality percentage of the camera lens LA in the embodiment 2; FNo of the camera lens LA in the embodiment 2 is 2.24. As shown in drawing 8-12, it is known that excellent optical properties and higher productivity are realized.

(Embodiment 3)

Figure 13:
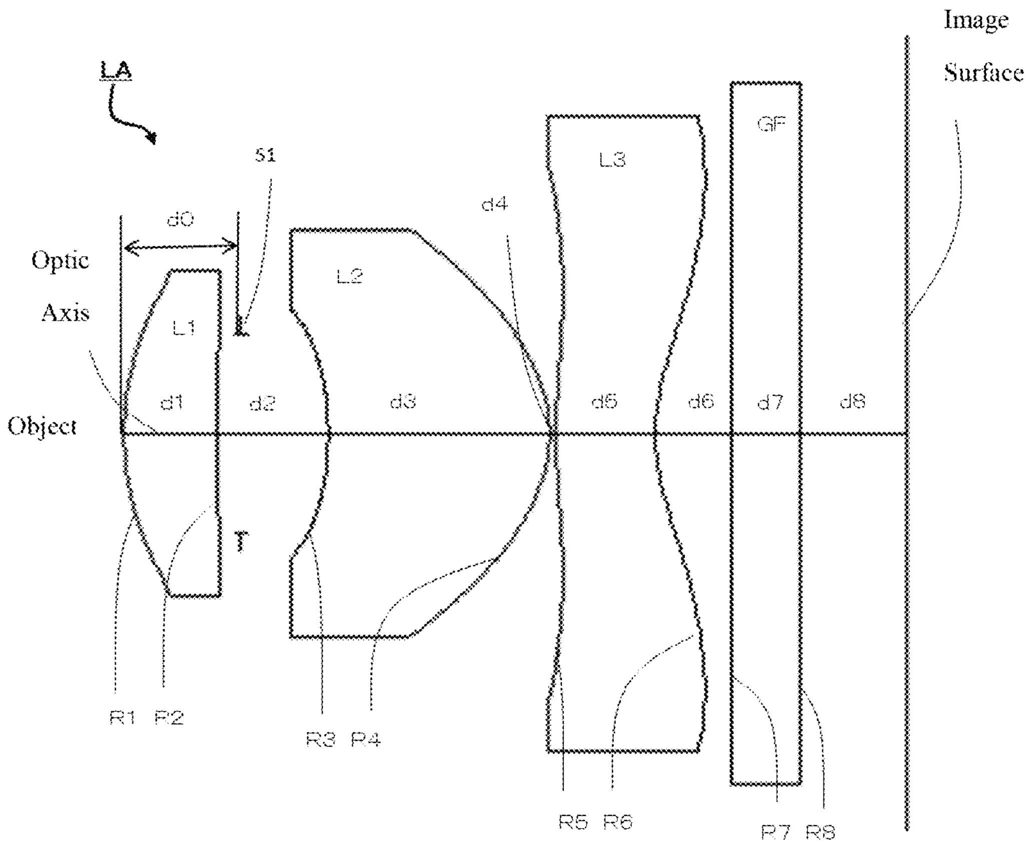
FIG. 13 is the composition diagram of the camera lens in the embodiment 3 of the present invention.

FIG. 13 is the structural diagram of the camera lens LA in the embodiment 3; The curvature radius of the object side and image, center thickness and the distance d between the lenses, refractive power nd and Abbe number v of the first lens, second lens and third lens of the camera lens LA in the embodiment 3 are shown in table 5. The cone constant k and aspherical coefficient are shown in table 6.

TABLE 5

| | R | | d | | nd | | vd |
|---|---|---|---|---|---|---|---|
| R1 | 1.29076 | d1 = | 0.419 | n1 | 1.509 | v1 | 56.5 |
| R2 | 8.04476 | d2 = | 0.109 | | | | |
| S1 | ∞ | d0 = | 0.394 | | | | |
| R3 | −1.38257 | d3 = | 1.000 | n2 | 1.522 | v2 | 52.2 |
| R4 | −0.62267 | d4 = | 0.030 | | | | |
| R5 | 2.52506 | d5 = | 0.446 | n3 | 1.642 | v3 | 22.4 |
| R6 | 0.75126 | d6 = | 0.350 | | | | |
| R7 | ∞ | d7 = | 0.300 | n4 | 1.523 | v4 | 54.5 |
| R8 | ∞ | d8 = | 0.484 | | | | |

The values of the embodiments 1-11 and the corresponding values of the parameters specified in the condition (1)-(12) are listed in table 23.

As shown in table 23, the embodiment 3 meets the condition (1) to (12).

Figure 14:
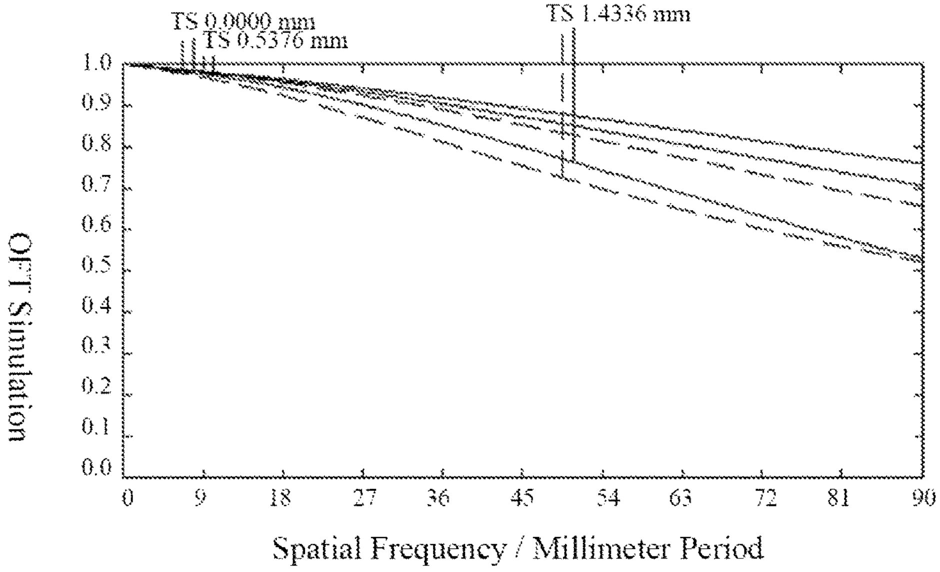
FIG. 14 is an MTF diagram of the camera lens shown in FIG. 13.
Figure 15:
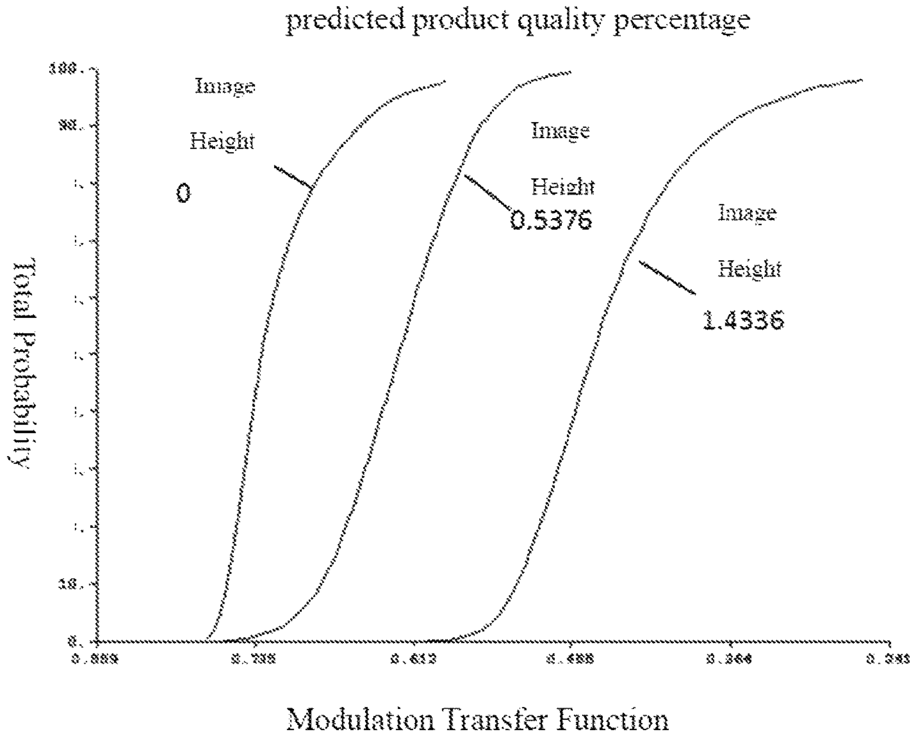
FIG. 15 is the diagram of predicted product quality percentage of the camera lens shown in FIG. 13.
Figure 16:
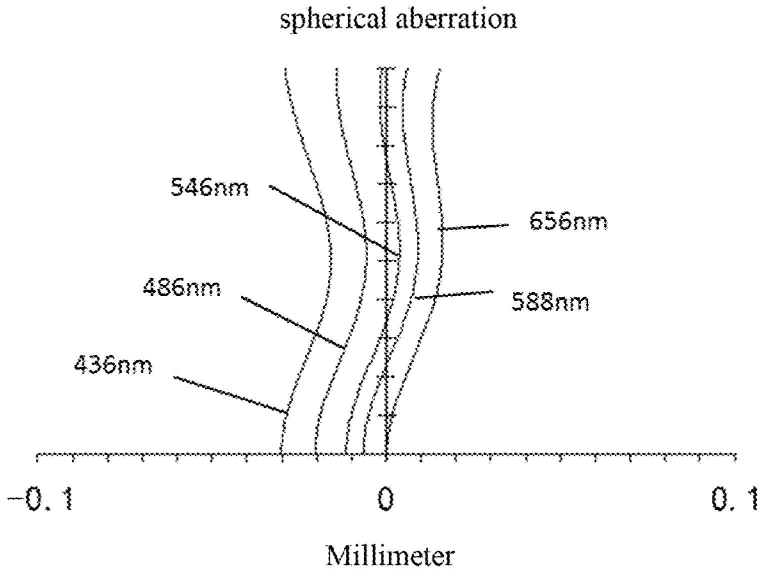
FIG. 16 is the diagram of the spherical aberration (axial chromatic aberration) of the camera lens shown in FIG. 13.
Figure 17:
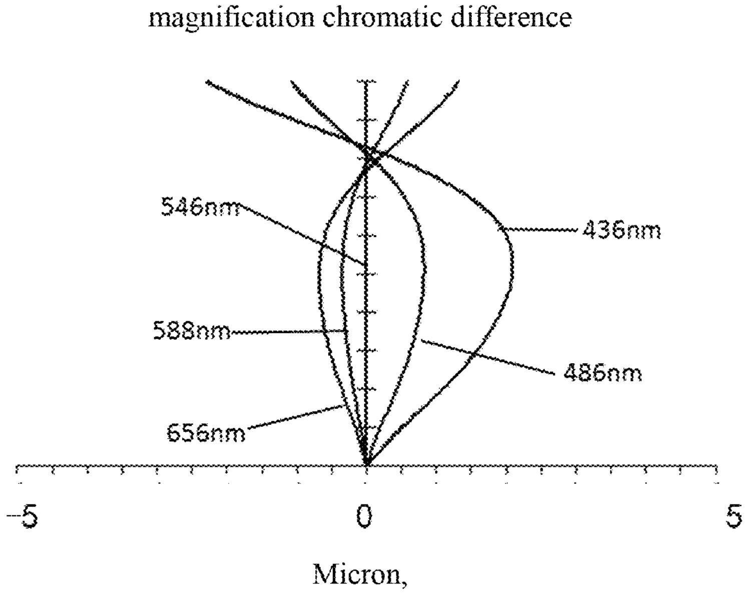
FIG. 17 is the diagram of magnification chromatic difference of the camera lens shown in FIG. 13.
Figure 18:
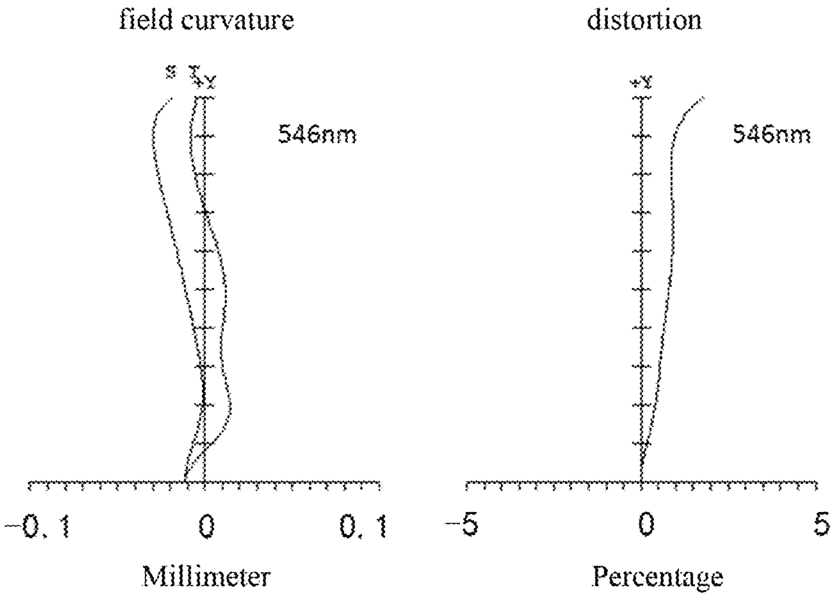
FIG. 18 is the diagram of field curvature and distortion of the camera lens shown in FIG. 13.

FIG. 14 is the MTF diagram of the camera lens LA in the embodiment 3; FIG. 15 is the predicted quality percentage of the camera lens LA in the embodiment 3; FNo of the camera lens LA in the embodiment 3 is 2.28. As shown in drawing 14-18, it is known that excellent optical properties and higher productivity are realized.

(Embodiment 4)

Figure 19:
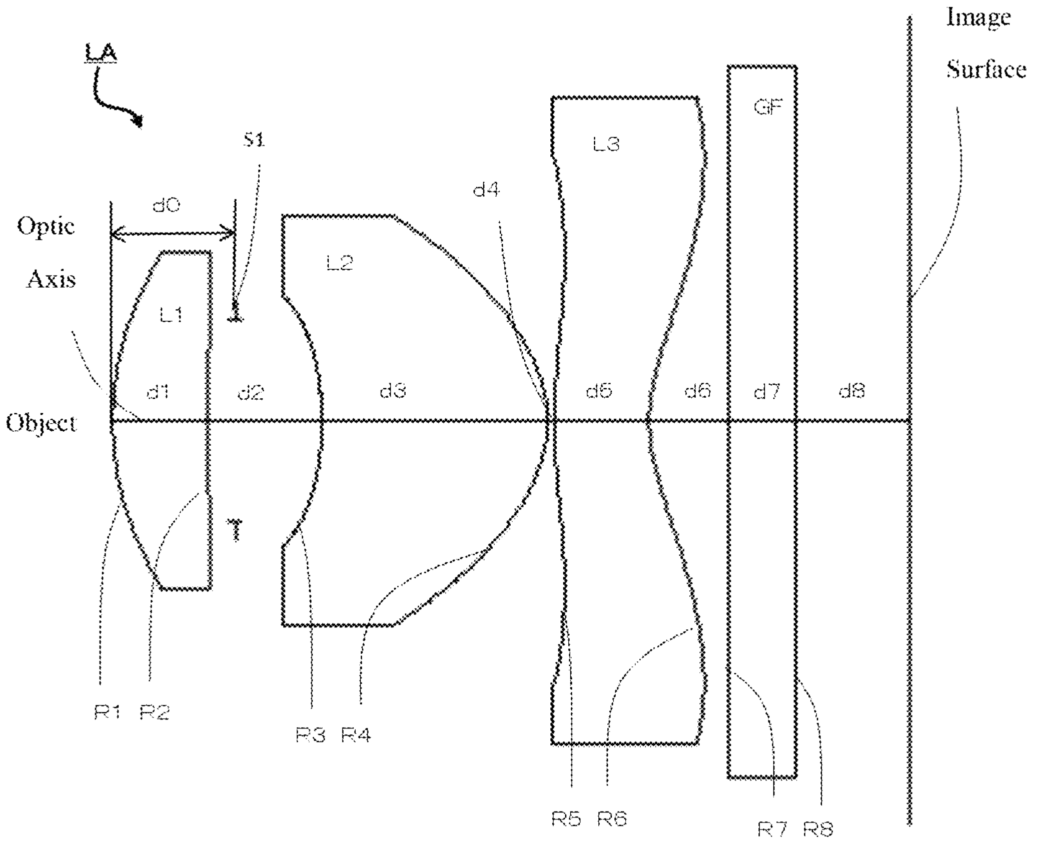
FIG. 19 is the composition diagram of the camera lens in the embodiment 4 of the present invention.

FIG. 19 is the structural diagram of the camera lens LA in the embodiment 4; The curvature radius of the object side and image, center thickness and the distance d between the lenses, refractive power nd and Abbe number v of the first lens, second lens and third lens of the camera lens LA in the embodiment 4 are shown in table 7. The cone constant k and aspherical coefficient are shown in table 8.

TABLE 7

| | R | | d | | nd | | vd |
|---|---|---|---|---|---|---|---|
| R1 | 1.34231 | d1 = | 0.420 | n1 | 1.509 | v1 | 56.5 |
| R2 | 8.00614 | d2 = | 0.122 | | | | |
| S1 | ∞ | d0 = | 0.383 | | | | |
| R3 | −1.34818 | d3 = | 1.000 | n2 | 1.462 | v2 | 52.2 |
| R4 | −0.56460 | d4 = | 0.030 | | | | |
| R5 | 1.99452 | d5 = | 0.421 | n3 | 1.642 | v3 | 22.4 |
| R6 | 0.68487 | d6 = | 0.350 | | | | |
| R7 | ∞ | d7 = | 0.300 | n4 | 1.523 | v4 | 54.5 |
| R8 | ∞ | d8 = | 0.500 | | | | |

TABLE 6

| | Cone Coefficient | Aspherical Coefficient | | | | | | |
|---|---|---|---|---|---|---|---|---|
| | k | A4 | A6 | A8 | A10 | A12 | A14 | A16 |
| R1 | −3.1909E−01 | 1.3268E−02 | 9.8404E−02 | −3.1184E−01 | 4.9487E−02 | 2.6355E−01 | −5.1634E−01 | −4.5614E−01 |
| R2 | 3.2411E+01 | −2.6510E−02 | −1.7730E−01 | 1.4351E−01 | −9.4493E−01 | 2.3528E−01 | 1.7960E+00 | −7.3316E−01 |
| R3 | 1.7267E+00 | −1.7319E−01 | −6.1082E−01 | −7.2189E−01 | 5.6239E+00 | −9.3649E+00 | 6.7591E−01 | −6.9038E−01 |
| R4 | −1.7400E+00 | −3.8316E−02 | −2.1757E−01 | −1.3781E−01 | 4.1900E−01 | −6.1249E−02 | −3.1930E−01 | 2.3209E−01 |
| R5 | −8.9184E+01 | −6.5883E−02 | −1.4341E−01 | 2.4933E−01 | −1.4876E−01 | 3.2531E−02 | −2.4945E−04 | −3.6068E−04 |
| R6 | −6.5478E+00 | −1.0513E−01 | −4.2265E−02 | 8.7079E−02 | −3.9221E−02 | 5.1989E−03 | −2.2658E−04 | 1.3997E−04 |

TABLE 8

| | Cone Coefficient | Aspherical Coefficient | | | | | | |
|---|---|---|---|---|---|---|---|---|
| | k | A4 | A6 | A8 | A10 | A12 | A14 | A16 |
| R1 | −3.0705E−01 | 2.2618E−02 | 1.0859E−02 | 1.0390E−02 | −1.5488E−01 | −5.4900E−02 | −3.2400E−01 | 0.0000E+00 |
| R2 | 3.8913E+01 | −2.1590E−02 | −1.0402E−01 | −1.7141E−01 | −1.9541E−01 | 1.7900E−01 | −6.5400E−02 | 5.8600E−01 |
| R3 | 1.8658E+00 | −1.6455E−01 | −8.2440E−01 | 4.2132E−01 | 1.5706E+00 | −4.0400E+00 | −6.4500E−01 | −6.7200E−01 |
| R4 | −1.7725E+00 | −8.5128E−02 | −2.3593E−01 | −2.5637E−02 | 1.0602E−01 | 1.1300E−02 | 3.4800E−02 | 0.0000E+00 |
| R5 | −5.2946E+01 | −6.5203E−02 | −8.7612E−02 | 1.2851E−01 | −5.9151E−02 | 7.6100E−03 | 1.5800E−04 | 0.0000E+00 |
| R6 | −6.2462E+00 | −1.4795E−01 | 8.9254E−02 | −4.7631E−02 | 1.6764E−02 | −2.7774E−03 | −2.3426E−04 | 9.8591E−05 |

The values of the embodiments 1-11 and the corresponding values of the parameters specified in the condition (1)-(12) are listed in table 23.

As shown in table 23, the embodiment 4 meets the condition (1) to (12).

Figure 20:
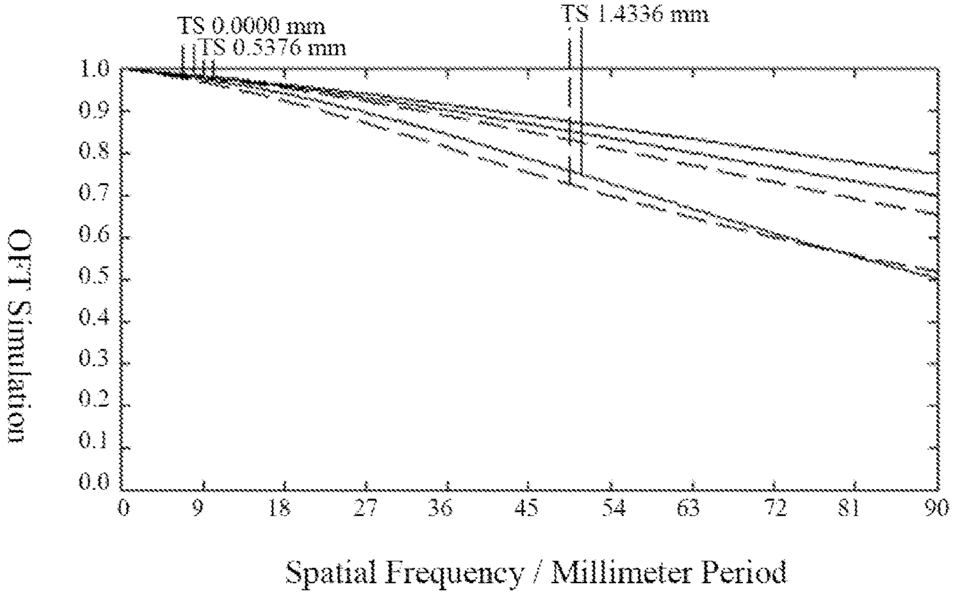
FIG. 20 is an MTF diagram of the camera lens shown in FIG. 19.
Figure 21:
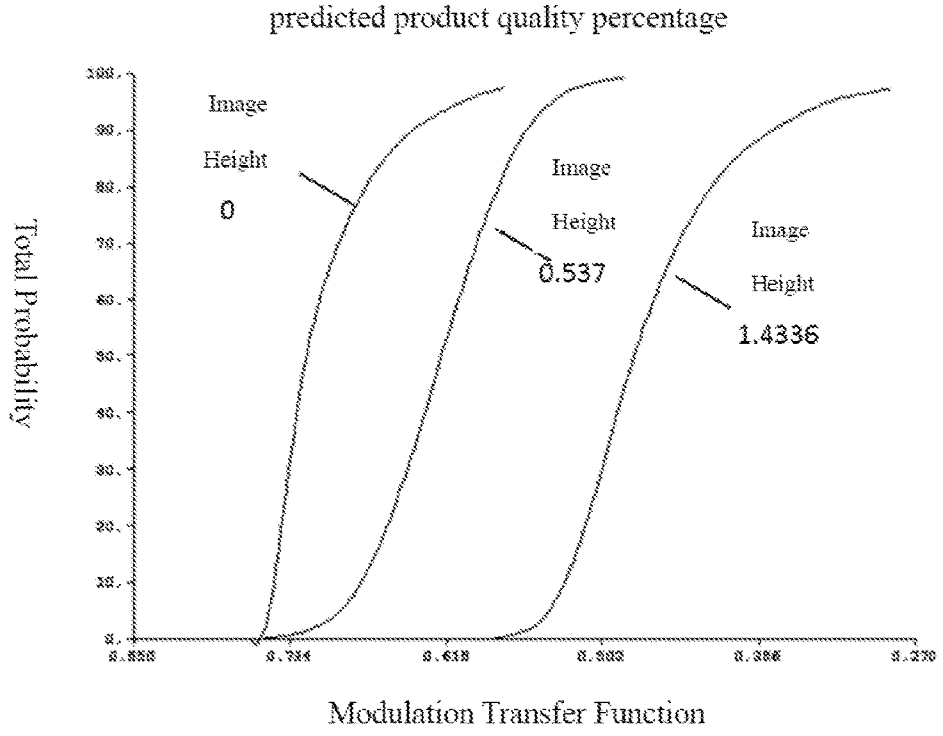
FIG. 21 is the diagram of predicted product quality percentage of the camera lens shown in FIG. 19.
Figure 22:
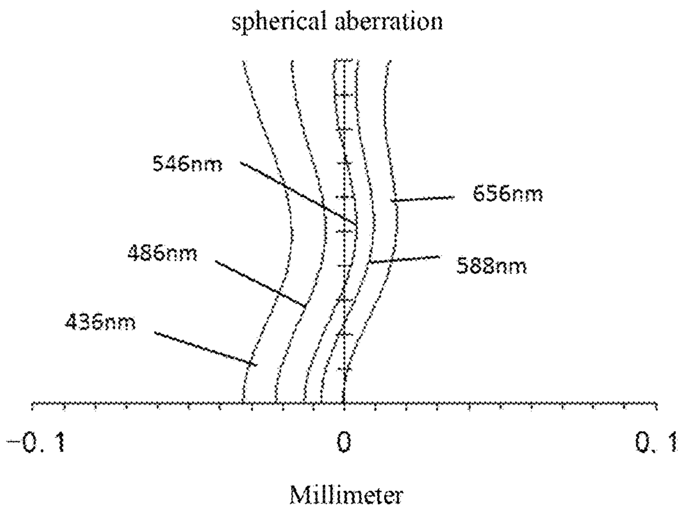
FIG. 22 is the diagram of the spherical aberration (axial chromatic aberration) of the camera lens shown in FIG. 19.
Figure 23:
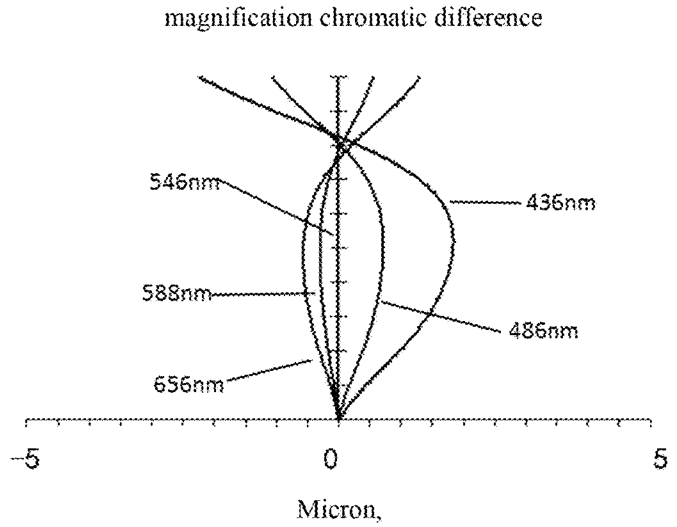
FIG. 23 is the diagram of magnification chromatic difference of the camera lens shown in FIG. 19.
Figure 24:
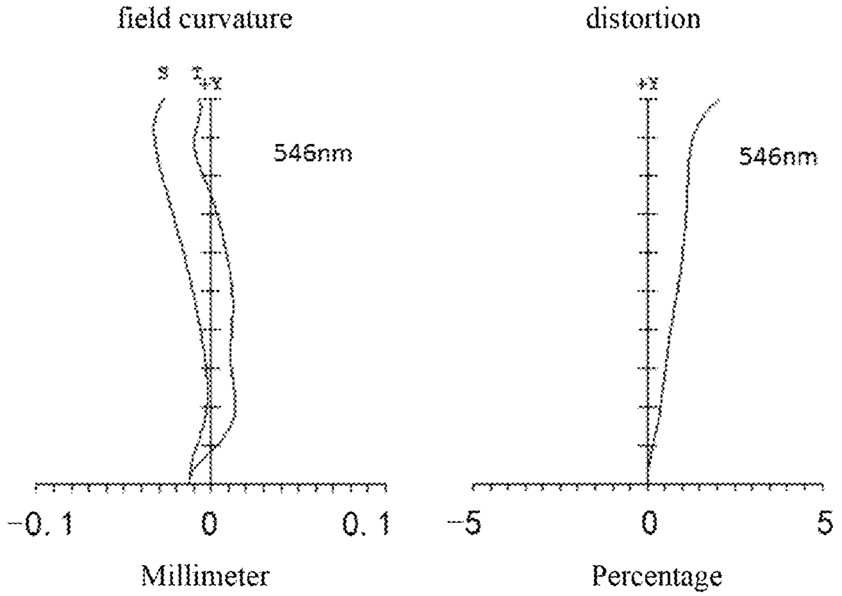
FIG. 24 is the diagram of field curvature and distortion of the camera lens shown in FIG. 19.

FIG. 20 is the MTF diagram of the camera lens LA in the embodiment 4; FIG. 21 is the predicted quality percentage of the camera lens LA in the embodiment 4; FNo of the camera lens LA in the embodiment 4 is 2.27. As shown in drawing 20-24, it is known that excellent optical properties and higher productivity are realized.

(Embodiment 5)

Figure 25:
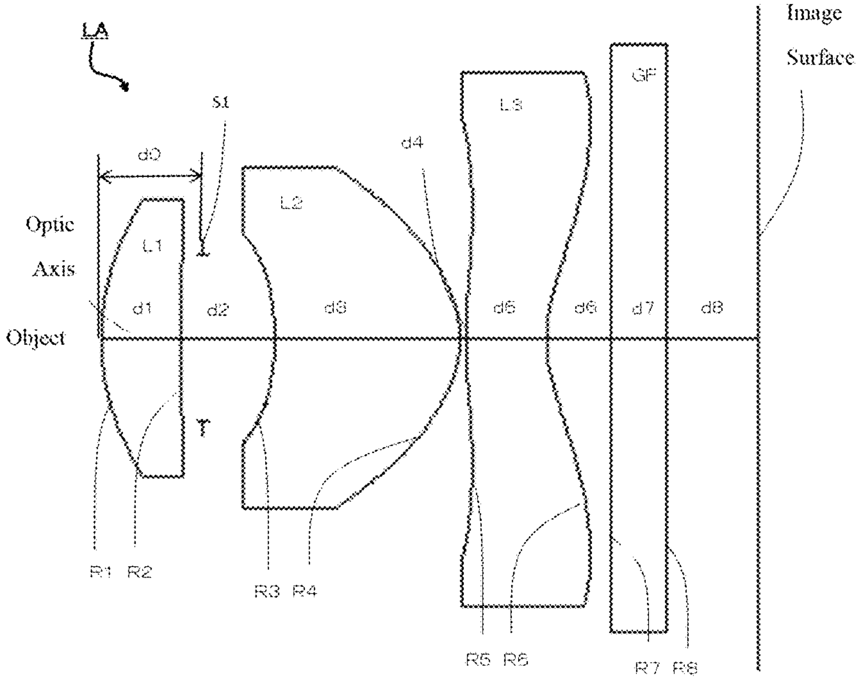
FIG. 25 is the composition diagram of the camera lens in the embodiment 5 of the present invention.

FIG. 25 is the structural diagram of the camera lens LA in the embodiment 5; The curvature radius of the object side and image, center thickness and the distance d between the lenses, refractive power nd and Abbe number v of the first lens, second lens and third lens of the camera lens LA in the embodiment 5 are shown in table 9. The cone constant k and aspherical coefficient are shown in table 10.

TABLE 9

| | R | | d | | nd | | vd |
|---|---|---|---|---|---|---|---|
| R1 | 1.32716 | d1 = | 0.423 | n1 | 1.509 | v1 | 56.5 |
| R2 | 7.66887 | d2 = | 0.122 | | | | |
| S1 | ∞ | d0 = | 0.387 | | | | |
| R3 | −1.38559 | d3 = | 1.000 | n2 | 1.492 | v2 | 52.2 |
| R4 | −0.58970 | d4 = | 0.030 | | | | |
| R5 | 2.26136 | d5 = | 0.436 | n3 | 1.642 | v3 | 22.4 |
| R6 | 0.71430 | d6 = | 0.350 | | | | |
| R7 | ∞ | d7 = | 0.300 | n4 | 1.523 | v4 | 54.5 |
| R8 | ∞ | d8 = | 0.494 | | | | |

The values of the embodiments 1-11 and the corresponding values of the parameters specified in the condition (1)-(12) are listed in table 23.

As shown in table 23, the embodiment 5 meets the condition (1) to (12).

Figure 26:
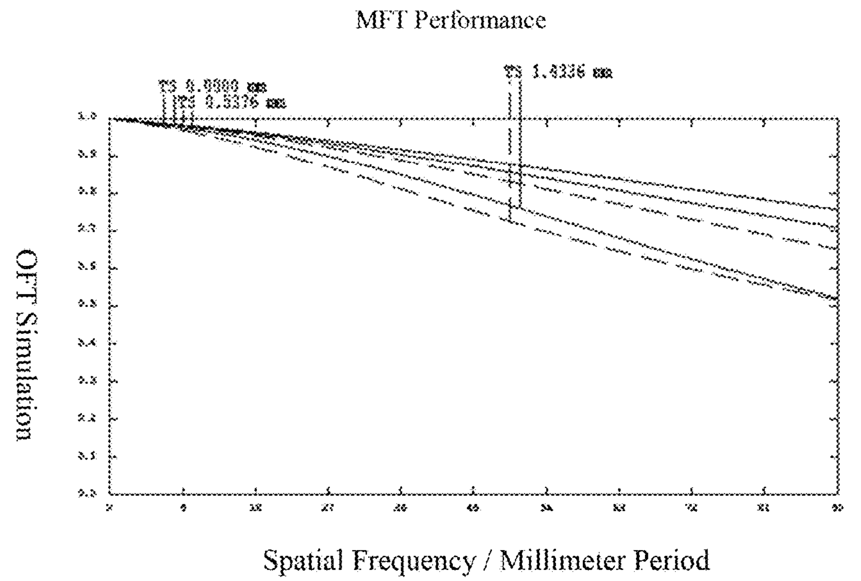
FIG. 26 is an MTF diagram of the camera lens shown in FIG. 25.
Figure 27:
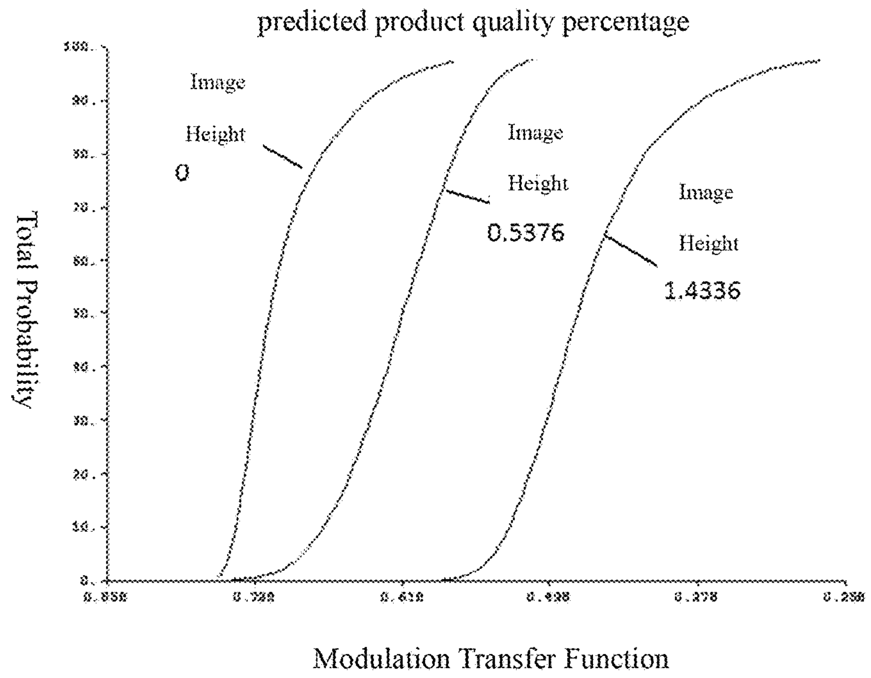
FIG. 27 is the diagram of predicted product quality percentage of the camera lens shown in FIG. 25.
Figure 28:
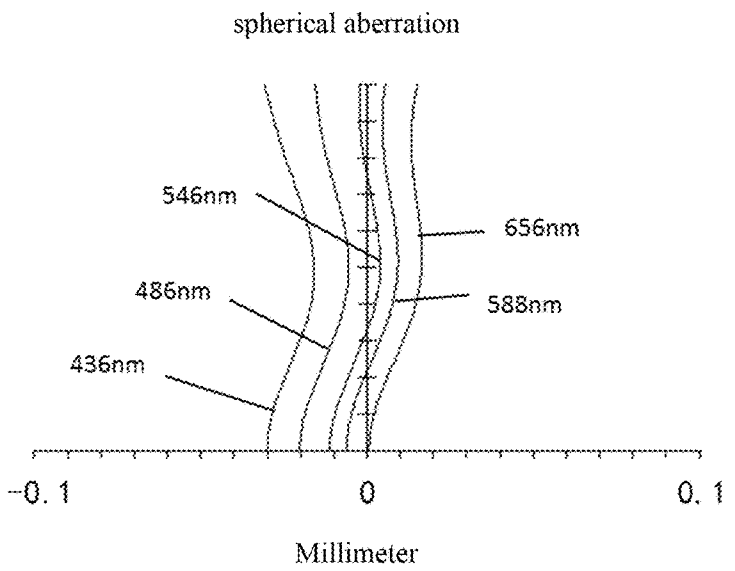
FIG. 28 is the diagram of the spherical aberration (axial chromatic aberration) of the camera lens shown in FIG. 25.
Figure 29:
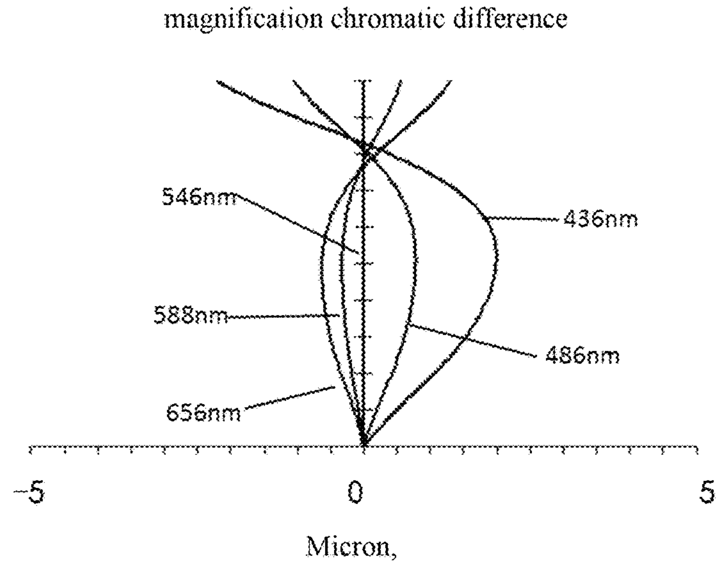
FIG. 29 is the diagram of magnification chromatic difference of the camera lens shown in FIG. 25.
Figure 30:
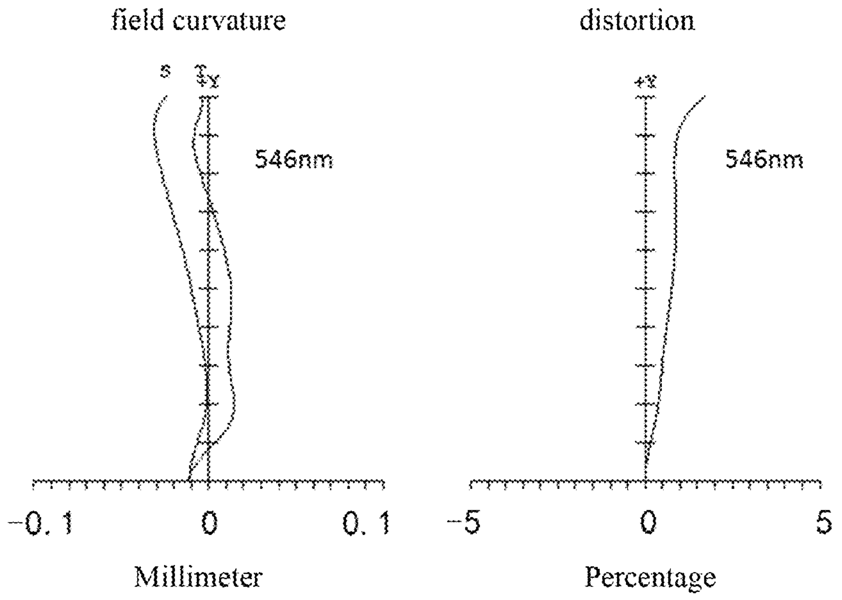
FIG. 30 is the diagram of field curvature and distortion of the camera lens shown in FIG. 25.

FIG. 26 is the MTF diagram of the camera lens LA in the embodiment 5; FIG. 27 is the predicted quality percentage of the camera lens LA in the embodiment 5; FNo of the camera lens LA in the embodiment 5 is 2.27. As shown in drawing 26-30, it is known that excellent optical properties and higher productivity are realized.

(Embodiment 6)

Figure 31:
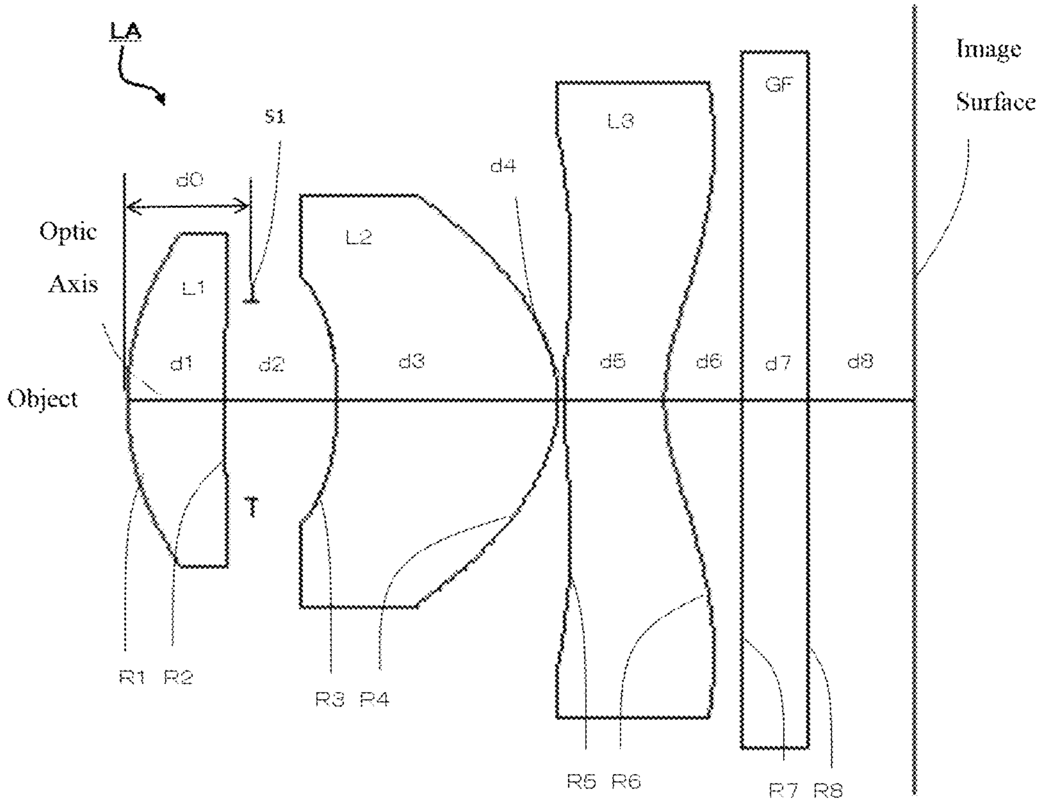
FIG. 31 is the composition diagram of the camera lens in the embodiment 6 of the present invention.

FIG. 31 is the structural diagram of the camera lens LA in the embodiment 6; The curvature radius of the object side and image, center thickness and the distance d between the lenses, refractive power nd and Abbe number v of the first lens, second lens and third lens of the camera lens LA in the embodiment 6 are shown in table 11. The cone constant k and aspherical coefficient are shown in table 12.

TABLE 11

| | R | | d | | nd | | vd |
|---|---|---|---|---|---|---|---|
| R1 | 1.28163 | d1 = | 0.439 | n1 | 1.509 | v1 | 56.5 |
| R2 | 6.69160 | d2 = | 0.125 | | | | |
| S1 | ∞ | d0 = | 0.387 | | | | |
| R3 | −1.44261 | d3 = | 1.000 | n2 | 1.552 | v2 | 52.2 |
| R4 | −0.65479 | d4 = | 0.030 | | | | |
| R5 | 2.62501 | d5 = | 0.454 | n3 | 1.642 | v3 | 22.4 |
| R6 | 0.77567 | d6 = | 0.350 | | | | |
| R7 | ∞ | d7 = | 0.300 | n4 | 1.523 | v4 | 54.5 |
| R8 | ∞ | d8 = | 0.487 | | | | |

TABLE 10

| | Cone Coefficient | Aspherical Coefficient | | | | | | |
|---|---|---|---|---|---|---|---|---|
| | k | A4 | A6 | A8 | A10 | A12 | A14 | A16 |
| R1 | −3.0407E−01 | 2.1060E−02 | 2.9755E−02 | −4.6591E−02 | −1.1208E−01 | 4.0080E−02 | −3.5411E−01 | −8.4315E−02 |
| R2 | 3.8367E+01 | −2.0428E−02 | −1.4357E−01 | 1.1539E−01 | −7.8980E−01 | 1.9779E−01 | 1.0230E+00 | 0.0000E+00 |
| R3 | 1.7783E+00 | −1.7123E−01 | −7.7784E−01 | 1.7594E−01 | 2.4801E+00 | −5.8406E+00 | 6.9200E−01 | 0.0000E+00 |
| R4 | −1.7724E+00 | −7.7243E−02 | −1.8683E−01 | −8.8117E−02 | 7.4012E−02 | 1.2792E−01 | 1.5296E−02 | −4.8263E−02 |
| R5 | −6.9640E+01 | −6.4018E−02 | −1.2378E−01 | 2.0983E−01 | −1.2642E−01 | 2.9594E−02 | 3.4018E−05 | −8.8634E−04 |
| R6 | −6.3888E+00 | −1.3592E−01 | 4.9183E−02 | −2.2429E−03 | −4.4376E−03 | 9.4929E−04 | −2.5103E−04 | 7.7061E−05 |

TABLE 12

| | Cone Coefficient | Aspherical Coefficient | | | | | | |
|---|---|---|---|---|---|---|---|---|
| | k | A4 | A6 | A8 | A10 | A12 | A14 | A16 |
| R1 | −2.6852E−01 | 2.0757E−02 | 5.9110E−02 | −1.3619E−01 | 6.6847E−02 | −3.6643E−02 | −2.4982E−01 | −1.8380E−01 |
| R2 | 3.8473E+01 | −2.1570E−02 | −1.3802E−01 | 2.1711E−01 | −1.0588E+00 | 2.3528E−01 | 1.7960E+00 | −7.3316E−01 |
| R3 | −1.6734E+00 | −4.0666E−02 | −1.3500E−01 | −1.6049E−01 | 1.4410E−01 | −4.3964E−02 | 3.0186E−01 | −2.0644E−01 |
| R4 | 1.7901E+00 | −1.6183E−01 | −6.4081E−01 | −7.6778E−01 | 5.7684E+00 | −9.3649E+00 | 6.7591E−01 | −6.9038E−01 |
| R5 | −9.0000E+01 | −7.5055E−02 | −1.2278E−01 | 2.1722E−01 | −1.2336E−01 | 2.6959E−02 | −9.3494E−04 | −2.0092E−04 |
| R6 | −6.4340E+00 | −1.2966E−01 | 3.1723E−02 | 7.1066E−03 | −1.0152E−03 | −2.4225E−03 | 2.2409E−04 | 1.3740E−04 |

The values of the embodiments 1-11 and the corresponding values of the parameters specified in the condition (1)-(12) are listed in table 23.

As shown in table 23, the embodiment 6 meets the condition (1) to (12).

Figure 32:
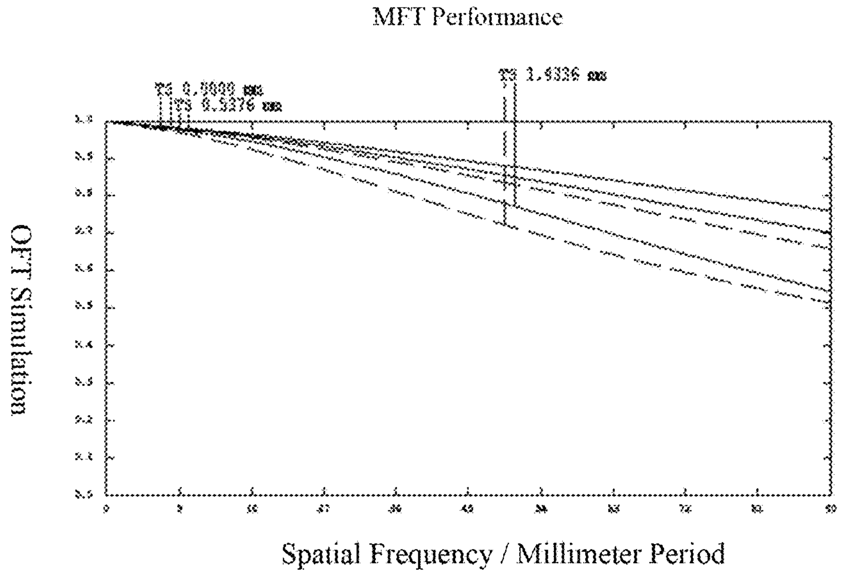
FIG. 32 is an MTF diagram of the camera lens shown in FIG. 31.
Figure 33:
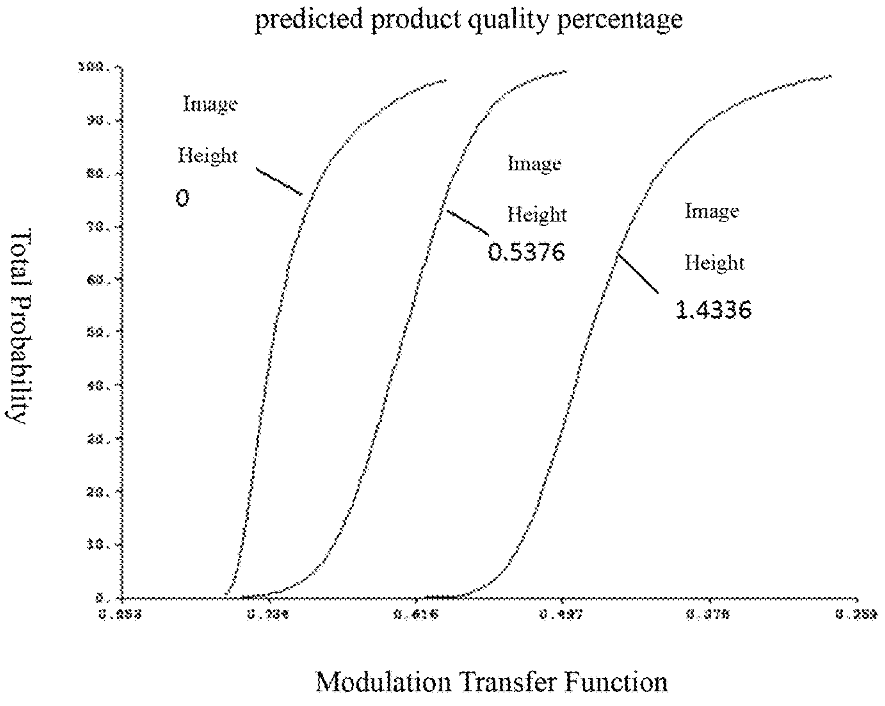
FIG. 33 is the diagram of predicted product quality percentage of the camera lens shown in FIG. 31.
Figure 34:
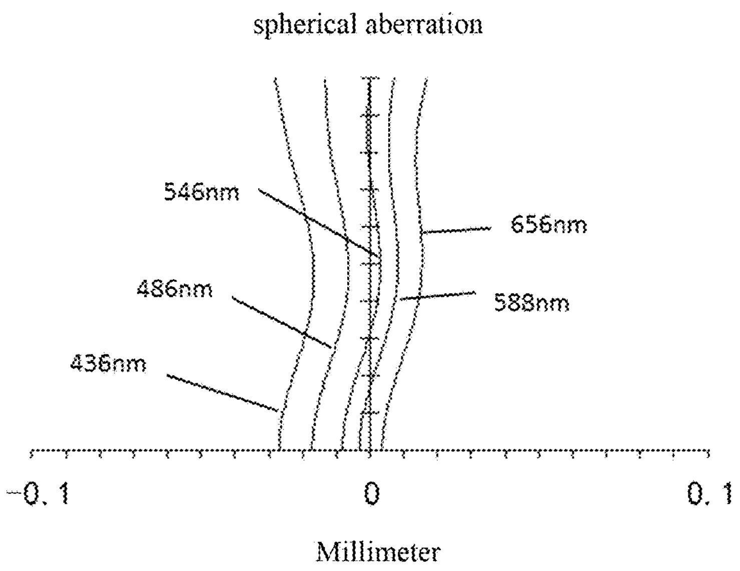
FIG. 34 is the diagram of the spherical aberration (axial chromatic aberration) of the camera lens shown in FIG. 31.
Figure 35:
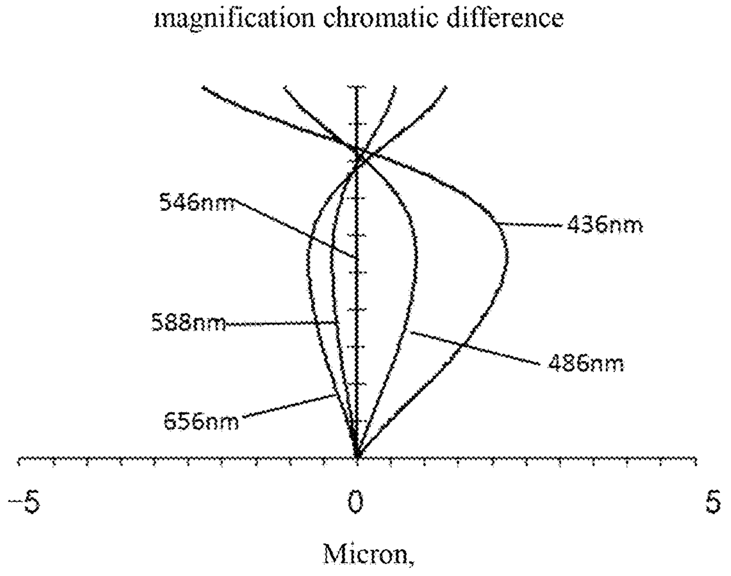
FIG. 35 is the diagram of magnification chromatic difference of the camera lens shown in FIG. 31.
Figure 36:
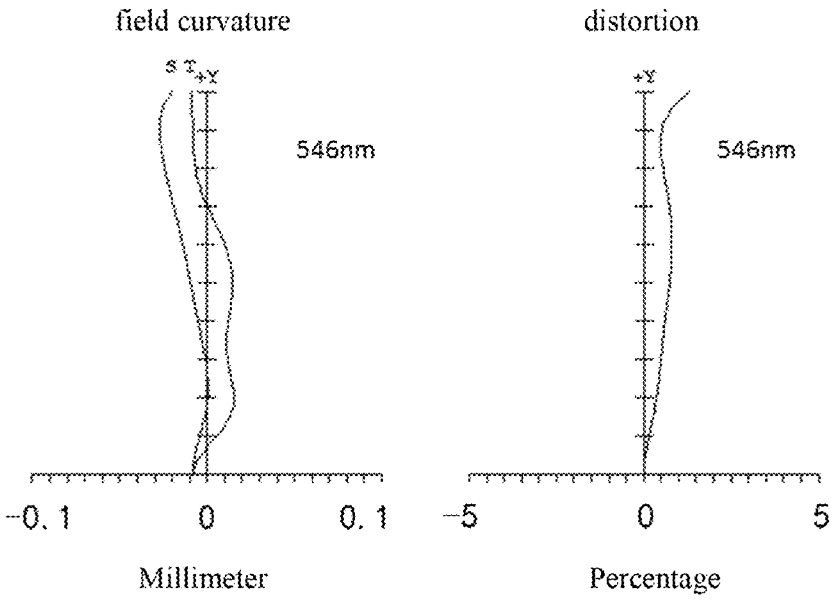
FIG. 36 is the diagram of field curvature and distortion of the camera lens shown in FIG. 31.

FIG. 32 is the MTF diagram of the camera lens LA in the embodiment 6; FIG. 33 is the predicted quality percentage of the camera lens LA in the embodiment 6; FNo of the camera lens LA in the embodiment 6 is 2.25. As shown in drawing 32-36, it is known that excellent optical properties and higher productivity are realized.

(Embodiment 7)

Figure 37:
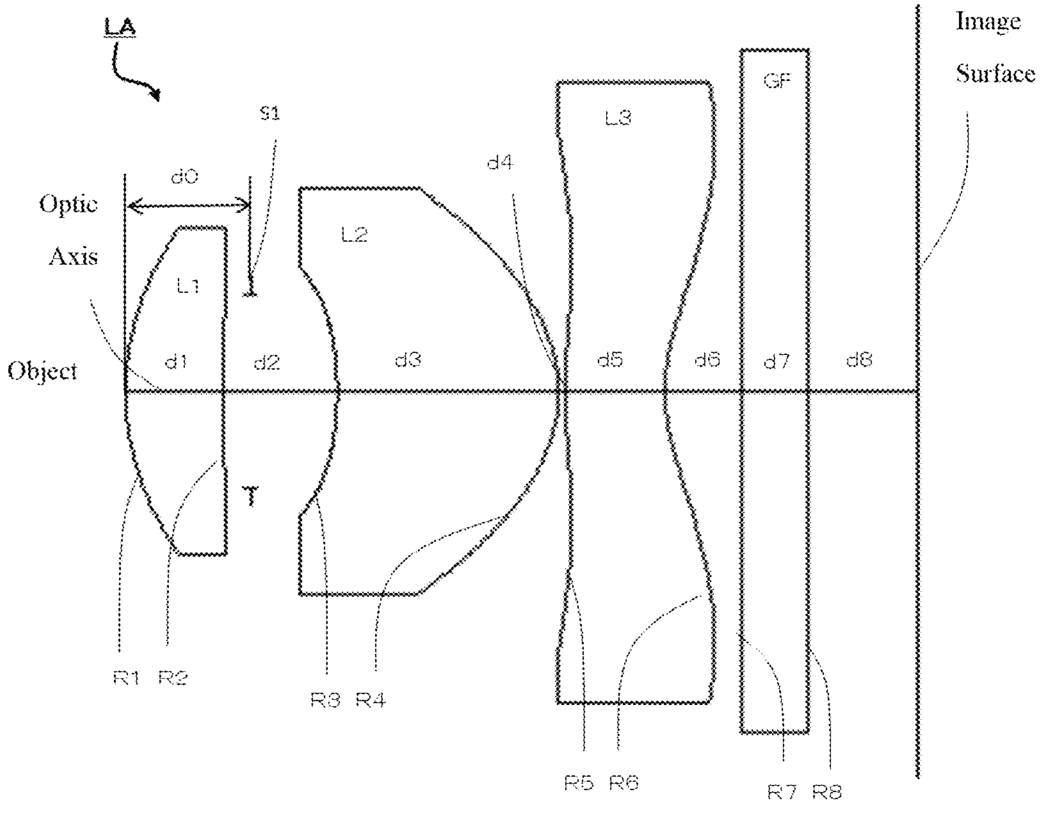
FIG. 37 is the composition diagram of the camera lens in the embodiment 7 of the present invention.

FIG. 37 is the structural diagram of the camera lens LA in the embodiment 7; The curvature radius of the object side and image, center thickness and the distance d between the lenses, refractive power nd and Abbe number v of the first lens, second lens and third lens of the camera lens LA in the embodiment 7 are shown in table 13. The cone constant k and aspherical coefficient are shown in table 14.

TABLE 13

| | R | | d | | nd | | vd |
|---|---|---|---|---|---|---|---|
| R1 | 1.28912 | d1 = | 0.438 | n1 | 1.509 | v1 | 56.5 |
| R2 | 6.88827 | d2 = | 0.127 | | | | |
| S1 | ∞ | d0 = | 0.390 | | | | |
| R3 | −1.49720 | d3 = | 1.000 | n2 | 1.582 | v2 | 52.2 |
| R4 | −0.68174 | d4 = | 0.031 | | | | |
| R5 | 2.66496 | d5 = | 0.449 | n3 | 1.642 | v3 | 22.4 |
| R6 | 0.78245 | d6 = | 0.350 | | | | |
| R7 | ∞ | d7 = | 0.300 | n4 | 1.523 | v4 | 54.5 |
| R8 | ∞ | d8 = | 0.488 | | | | |

The values of the embodiments 1-11 and the corresponding values of the parameters specified in the condition (1)-(12) are listed in table 23.

As shown in table 23, the embodiment 7 meets the condition (1) to (12).

Figure 38:
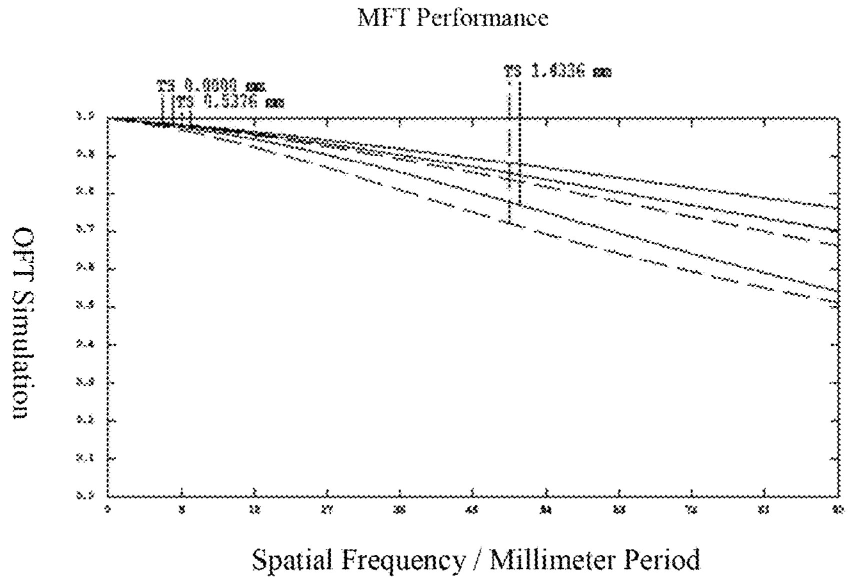
FIG. 38 is an MTF diagram of the camera lens shown in FIG. 37.
Figure 39:
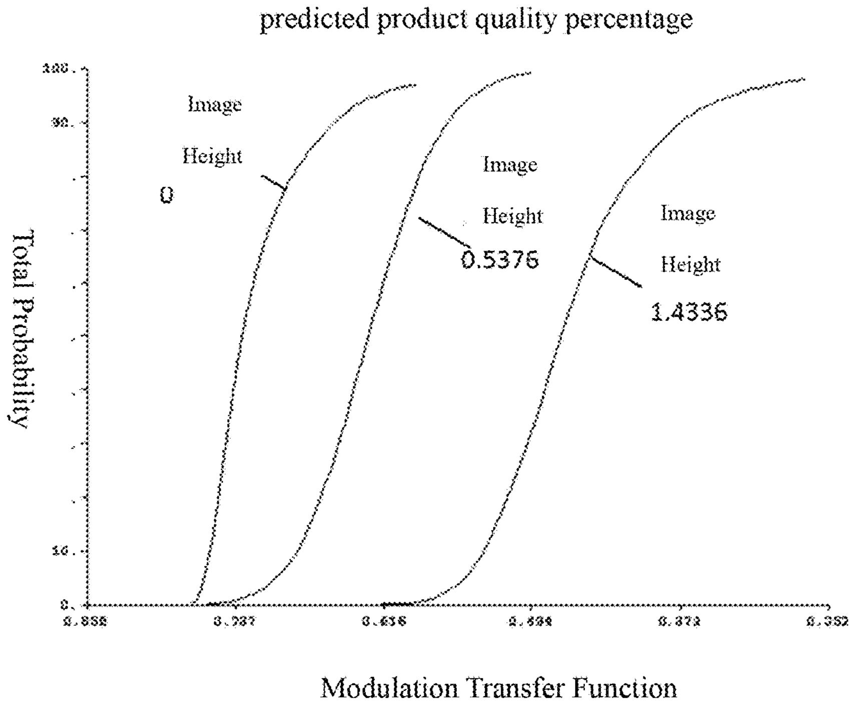
FIG. 39 is the diagram of predicted product quality percentage of the camera lens shown in FIG. 37.
Figure 40:
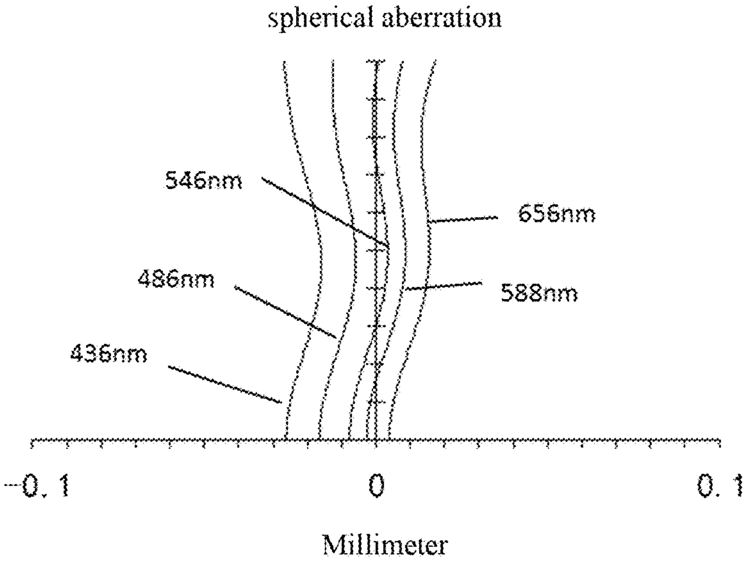
FIG. 40 is the diagram of the spherical aberration (axial chromatic aberration) of the camera lens shown in FIG. 37.
Figure 41:
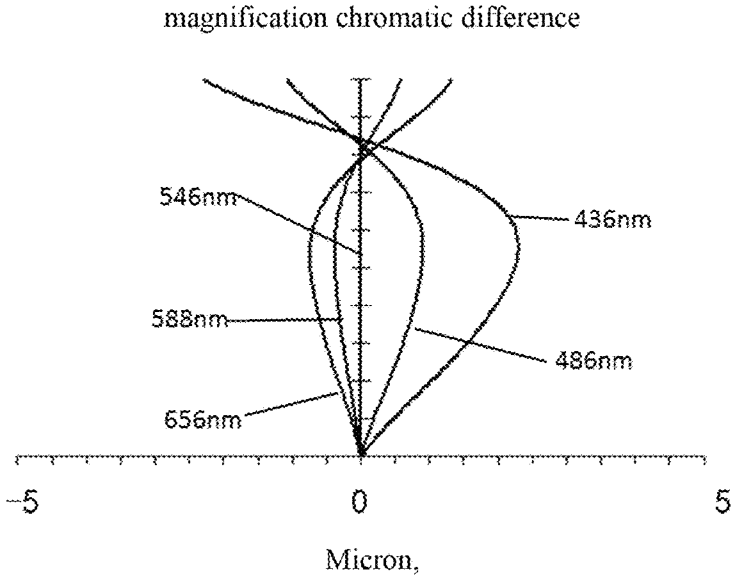
FIG. 41 is the diagram of magnification chromatic difference of the camera lens shown in FIG. 37.
Figure 42:
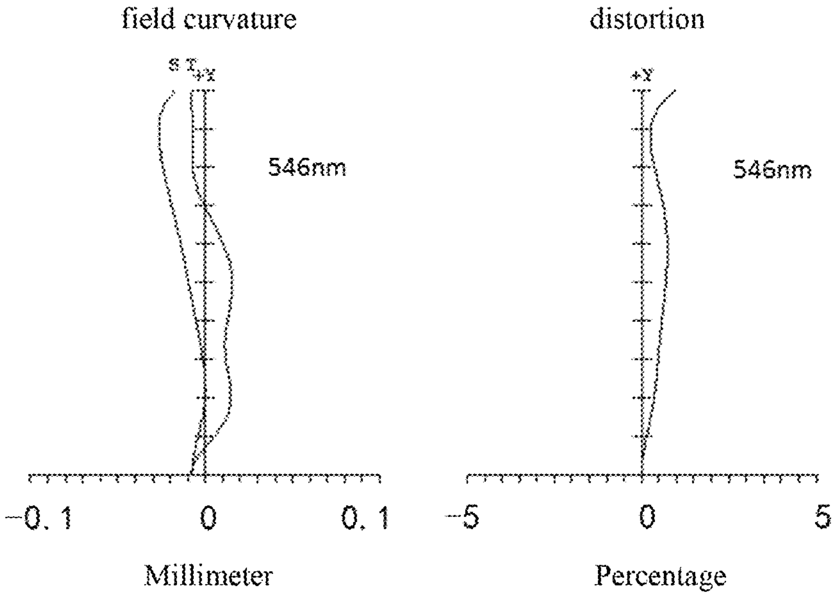
FIG. 42 is the diagram of field curvature and distortion of the camera lens shown in FIG. 37.

FIG. 38 is the MTF diagram of the camera lens LA in the embodiment 7; FIG. 39 is the predicted quality percentage of the camera lens LA in the embodiment 7; FNo of the camera lens LA in the embodiment 7 is 2.23. As shown in drawing 38-42, it is known that excellent optical properties and higher productivity are realized.

(Embodiment 8)

Figure 43:
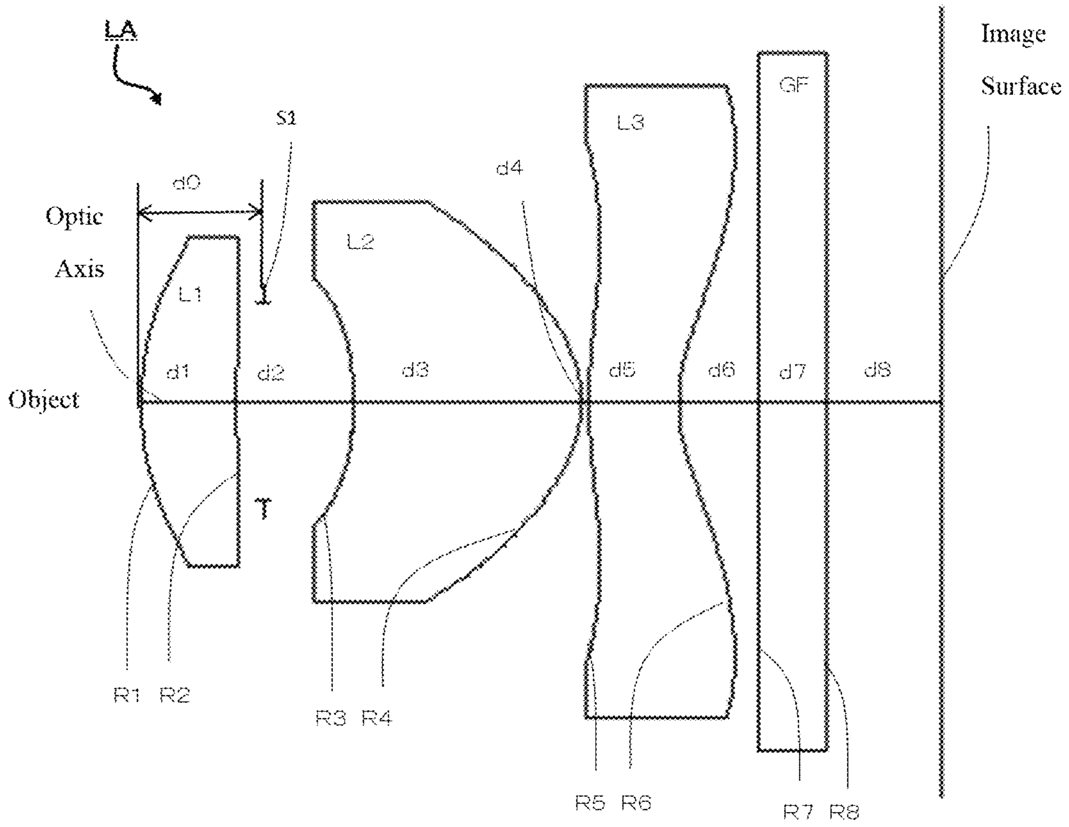
FIG. 43 is the composition diagram of the camera lens in the embodiment 8 of the present invention.

FIG. 43 is the structural diagram of the camera lens LA in the embodiment 8; The curvature radius of the object side and image, center thickness and the distance d between the lenses, refractive power nd and Abbe number v of the first lens, second lens and third lens of the camera lens LA in the embodiment 8 are shown in table 15. The cone constant k and aspherical coefficient are shown in table 16.

TABLE 15

| | R | | d | | nd | | vd |
|---|---|---|---|---|---|---|---|
| R1 | 1.34084 | d1 = | 0.417 | n1 | 1.509 | v1 | 56.5 |
| R2 | 8.33655 | d2 = | 0.119 | | | | |
| S1 | ∞ | d0 = | 0.395 | | | | |
| R3 | −1.35192 | d3 = | 1.000 | n2 | 1.462 | v2 | 48.2 |
| R4 | −0.55824 | d4 = | 0.030 | | | | |
| R5 | 1.84310 | d5 = | 0.397 | n3 | 1.642 | v3 | 22.4 |
| R6 | 0.65334 | d6 = | 0.350 | | | | |
| R7 | ∞ | d7 = | 0.300 | n4 | 1.523 | v4 | 54.5 |
| R8 | ∞ | d8 = | 0.501 | | | | |

TABLE 14

| | Cone Coefficient | Aspherical Coefficient | | | | | | |
|---|---|---|---|---|---|---|---|---|
| | k | A4 | A6 | A8 | A10 | A12 | A14 | A16 |
| R1 | −2.9394E−01 | 1.7926E−02 | 6.8402E−02 | −2.1568E−01 | 2.1962E−01 | 1.6300E−02 | −7.3450E−01 | 2.5162E−01 |
| R2 | 3.5106E+01 | −2.2604E−02 | −1.3089E−01 | 1.5143E−01 | −7.7528E−01 | 1.9564E−01 | 8.0597E−01 | 2.1465E−01 |
| R3 | 1.6175E+00 | −1.7137E−01 | −5.9155E−01 | −8.3476E−01 | 5.2450E+00 | −7.9522E+00 | 6.5176E−01 | −7.1118E−01 |
| R4 | −1.6569E+00 | −1.7896E−02 | −1.9536E−01 | −1.6031E−01 | 3.9290E−01 | −4.6386E−02 | −2.9751E−01 | 1.9782E−01 |
| R5 | −9.0000E+01 | −1.0319E−01 | −5.2120E−02 | 1.3276E−01 | −7.5766E−02 | 1.6949E−02 | −7.7872E−04 | −2.2679E−04 |
| R6 | −6.2898E+00 | −1.5158E−01 | 8.6790E−02 | −4.3471E−02 | 1.5946E−02 | −2.7748E−03 | −2.0192E−04 | 9.6462E−05 |

TABLE 16

| | Cone Coefficient | Aspherical Coefficient | | | | | | |
|---|---|---|---|---|---|---|---|---|
| | k | A4 | A6 | A8 | A10 | A12 | A14 | A16 |
| R1 | −3.2891E−01 | 1.8253E−02 | 4.5577E−02 | −1.4790E−01 | 4.4439E−02 | 4.2900E−02 | −7.5268E−01 | 2.4655E−01 |
| R2 | 3.5170E+01 | −1.8417E−02 | −1.8142E−01 | 2.6648E−01 | −1.1092E+00 | 2.3528E−01 | 1.7960E+00 | −7.3316E−01 |
| R3 | 1.7894E+00 | −1.7235E−01 | −6.6107E−01 | −8.6966E−01 | 5.8829E+00 | −9.3649E+00 | −6.7591E−01 | −6.9038E−01 |
| R4 | −1.8208E+00 | −8.4070E−02 | −2.5008E−01 | −1.1451E−01 | 4.2633E−01 | −1.1137E−01 | −3.6636E−01 | 3.2272E−01 |
| R5 | −4.7984E+01 | −1.0494E−01 | 3.9853E−02 | −9.7995E−03 | −4.0816E−02 | 3.8920E−02 | 4.0071E−05 | −5.6485E−03 |
| R6 | −6.1077E+00 | −2.1676E−01 | 2.7436E−01 | −2.2579E−01 | 8.6468E−02 | −1.1647E−02 | −3.8466E−04 | 5.4240E−05 |

The values of the embodiments 1-11 and the corresponding values of the parameters specified in the condition (1)-(12) are listed in table 23.

As shown in table 23, the embodiment 8 meets the condition (1) to (12).

Figure 44:
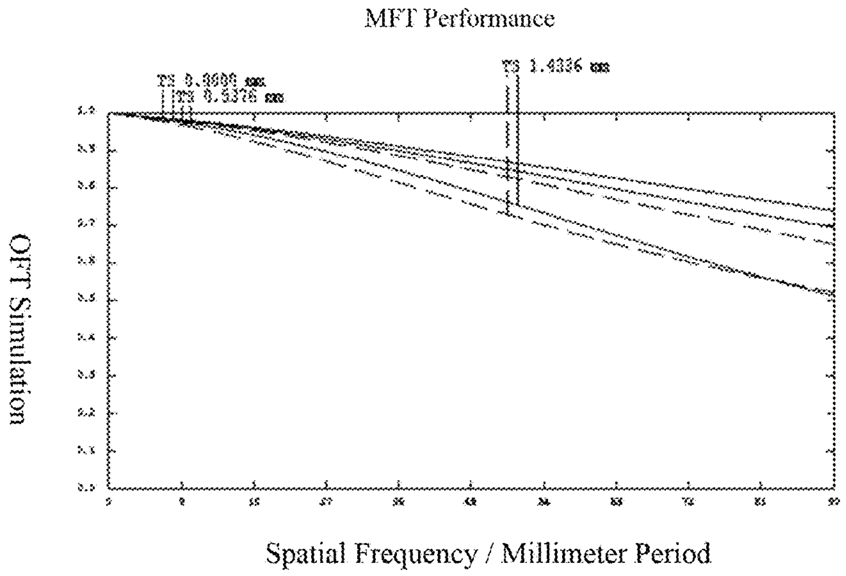
FIG. 44 is an MTF diagram of the camera lens shown in FIG. 43.
Figure 45:
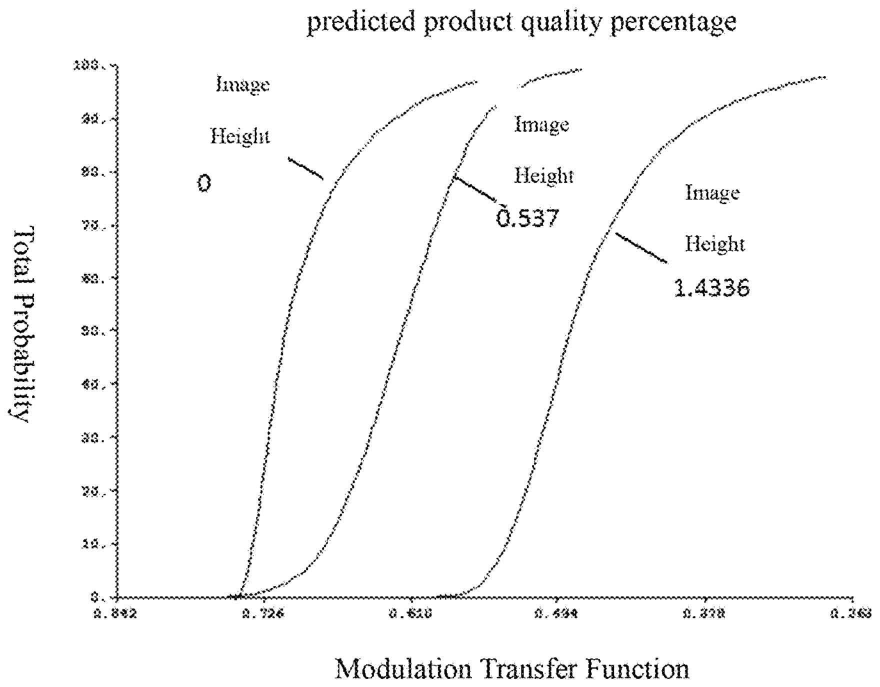
FIG. 45 is the diagram of predicted product quality percentage of the camera lens shown in FIG. 43.
Figure 46:
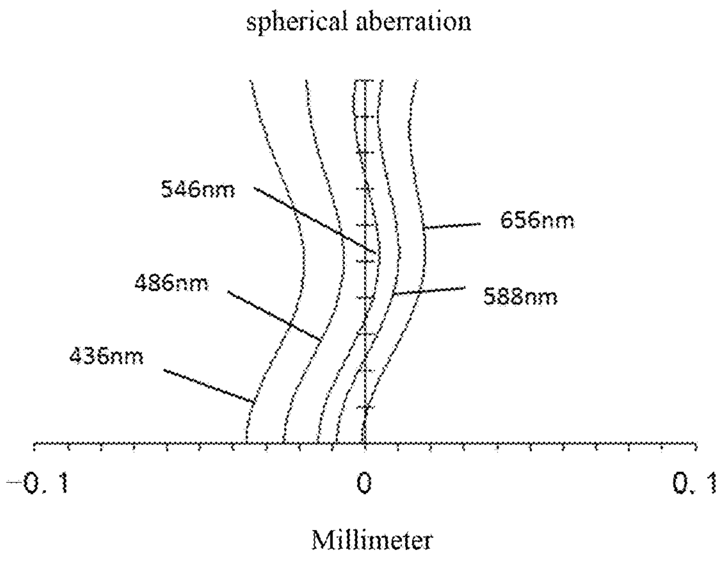
FIG. 46 is the diagram of the spherical aberration (axial chromatic aberration) of the camera lens shown in FIG. 43.
Figure 47:
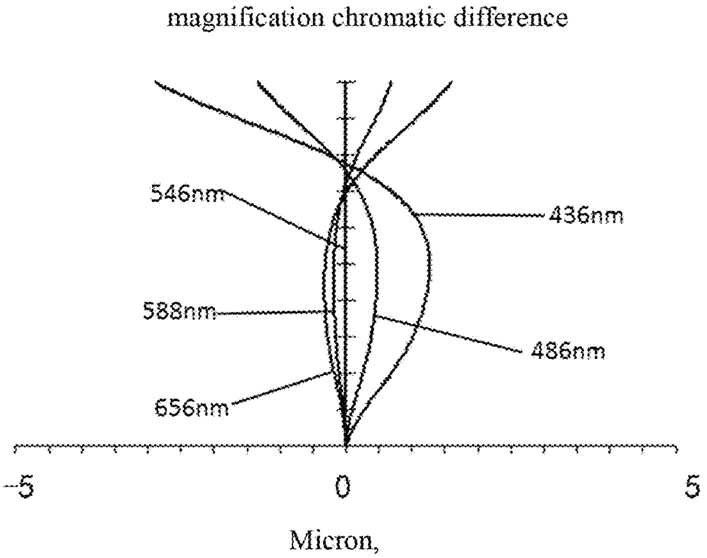
FIG. 47 is the diagram of magnification chromatic difference of the camera lens shown in FIG. 43.
Figure 48:
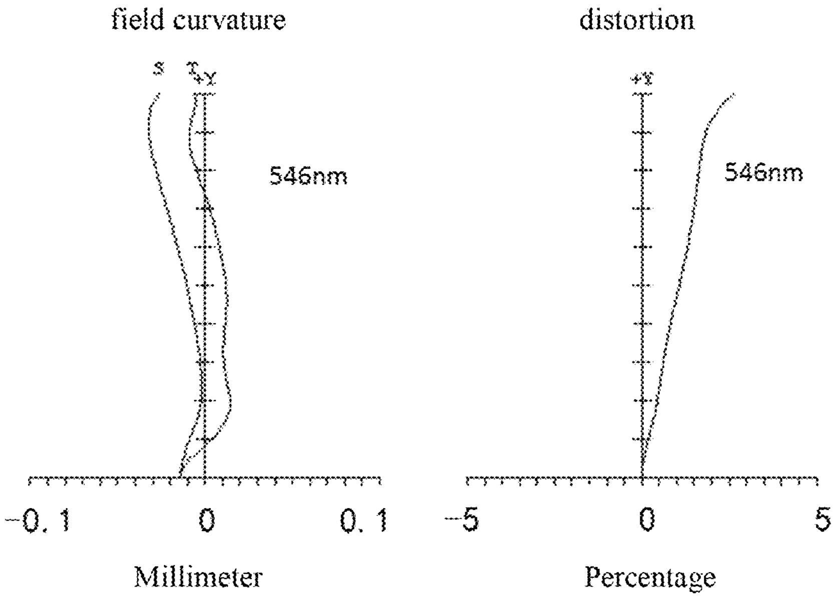
FIG. 48 is the diagram of field curvature and distortion of the camera lens shown in FIG. 43.

FIG. 44 is the MTF diagram of the camera lens LA in the embodiment 8; FIG. 45 is the predicted quality percentage of the camera lens LA in the embodiment 8; FNo of the camera lens LA in the embodiment 8 is 2.28. As shown in drawing 44-48, it is known that excellent optical properties and higher productivity are realized.

(Embodiment 9)

Figure 49:
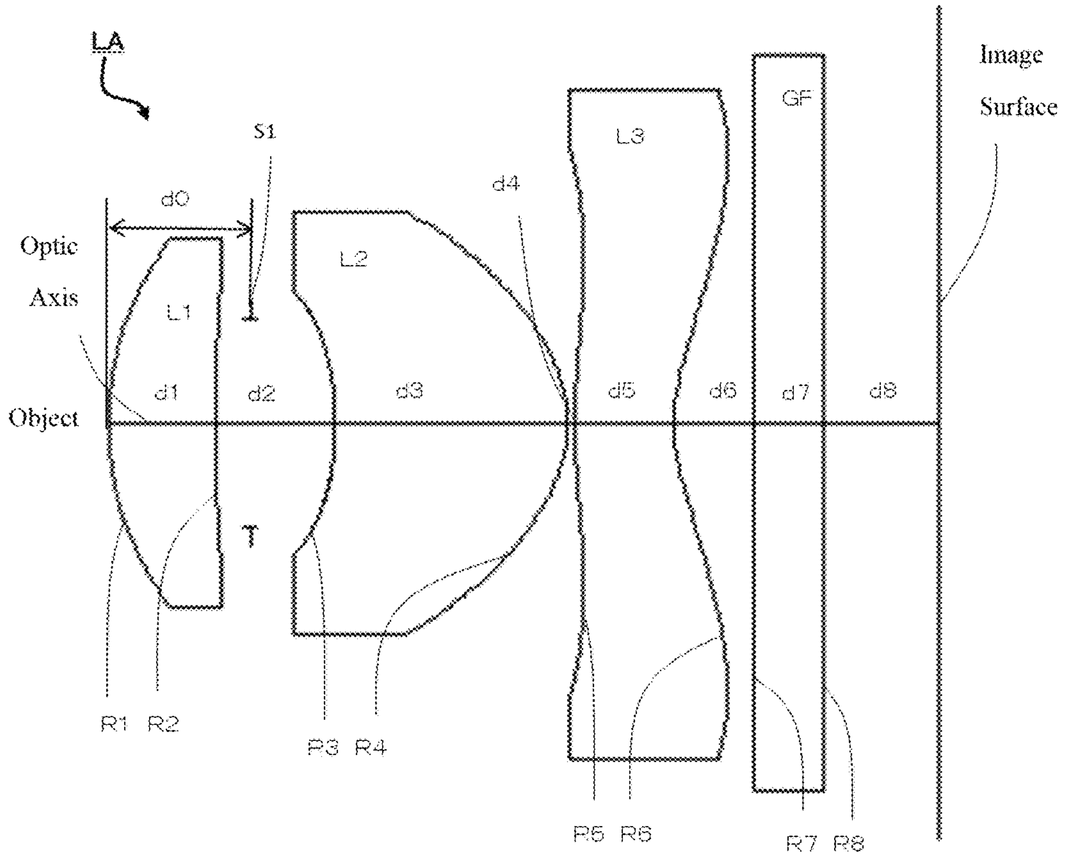
FIG. 49 is the composition diagram of the camera lens in the embodiment 9 of the present invention.

FIG. 49 is the structural diagram of the camera lens LA in the embodiment 9; The curvature radius of the object side and image, center thickness and the distance d between the lenses, refractive power nd and Abbe number v of the first lens, second lens and third lens of the camera lens LA in the embodiment 9 are shown in table 17. The cone constant k and aspherical coefficient are shown in table 18.

TABLE 17

| | R | | d | | nd | | vd |
|---|---|---|---|---|---|---|---|
| R1 | 1.31469 | d1 = | 0.459 | n1 | 1.509 | v1 | 56.5 |
| R2 | 6.42398 | d2 = | 0.149 | | | | |
| S1 | ∞ | d0 = | 0.365 | | | | |
| R3 | −1.38652 | d3 = | 1.000 | n2 | 1.492 | v2 | 50.2 |
| R4 | −0.57673 | d4 = | 0.030 | | | | |
| R5 | 2.26220 | d5 = | 0.424 | n3 | 1.642 | v3 | 22.4 |
| R6 | 0.70918 | d6 = | 0.350 | | | | |
| R7 | ∞ | d7 = | 0.300 | n4 | 1.523 | v4 | 54.5 |
| R8 | ∞ | d8 = | 0.493 | | | | |

The values of the embodiments 1-11 and the corresponding values of the parameters specified in the condition (1)-(12) are listed in table 23.

As shown in table 23, the embodiment 9 meets the conditions (1) to (12).

Figure 50:
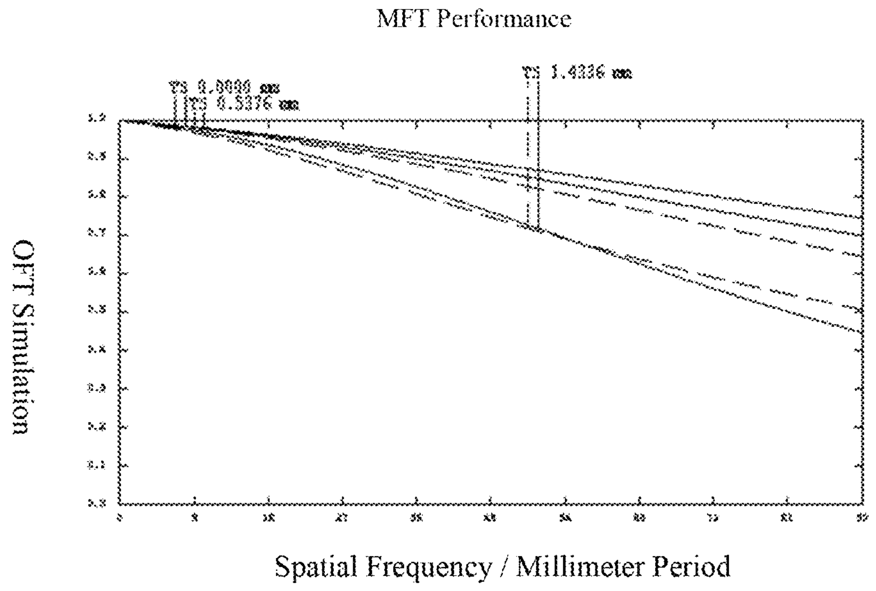
FIG. 50 is an MTF diagram of the camera lens shown in FIG. 49.
Figure 51:
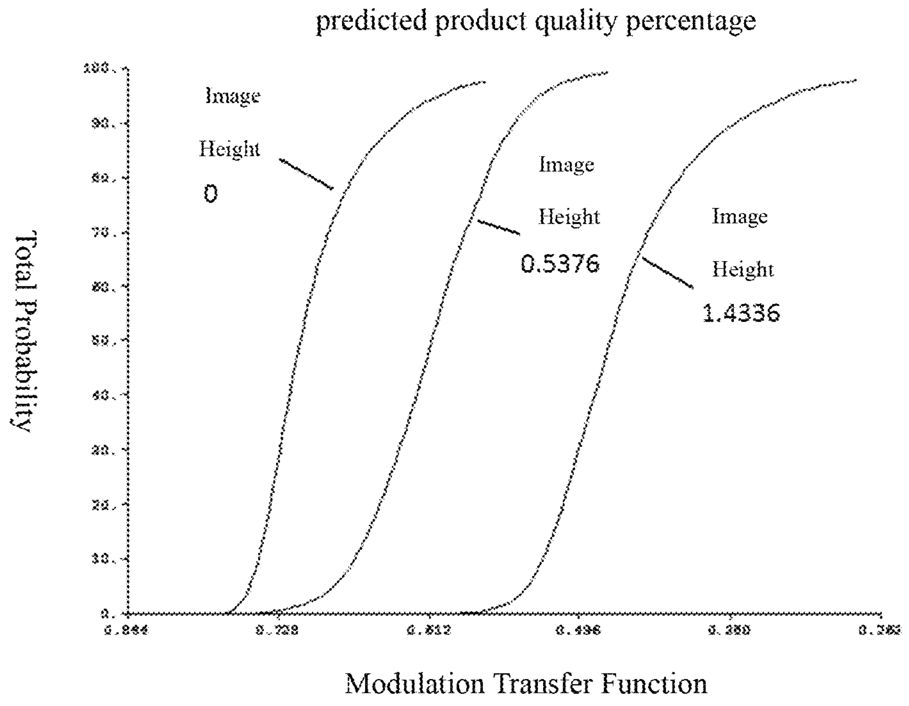
FIG. 51 is the diagram of predicted product quality percentage of the camera lens shown in FIG. 49.
Figure 52:
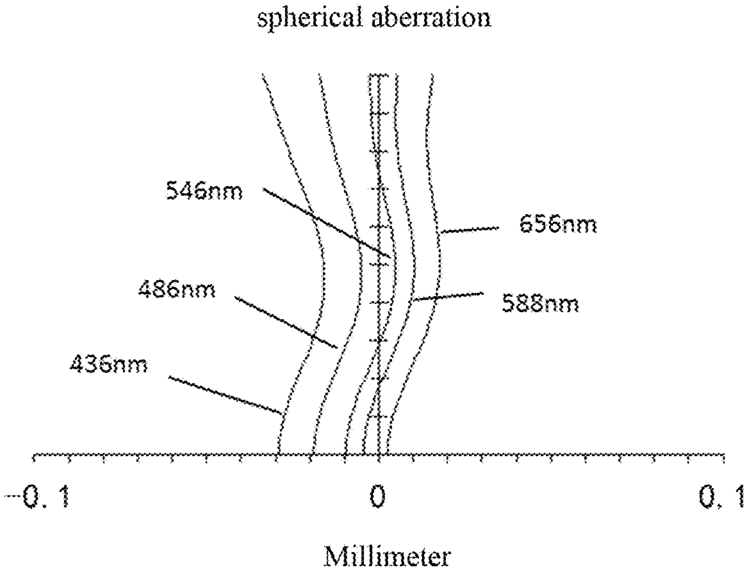
FIG. 52 is the diagram of the spherical aberration (axial chromatic aberration) of the camera lens shown in FIG. 49.
Figure 53:
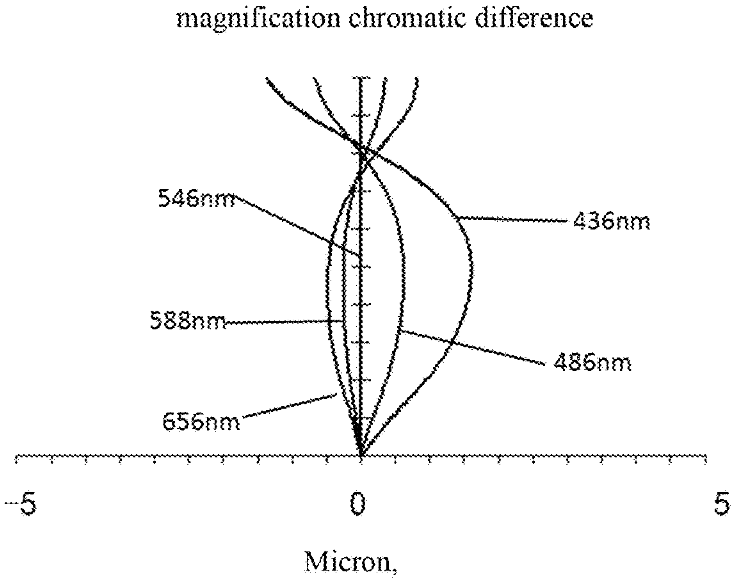
FIG. 53 is the diagram of magnification chromatic difference of the camera lens shown in FIG. 49.
Figure 54:
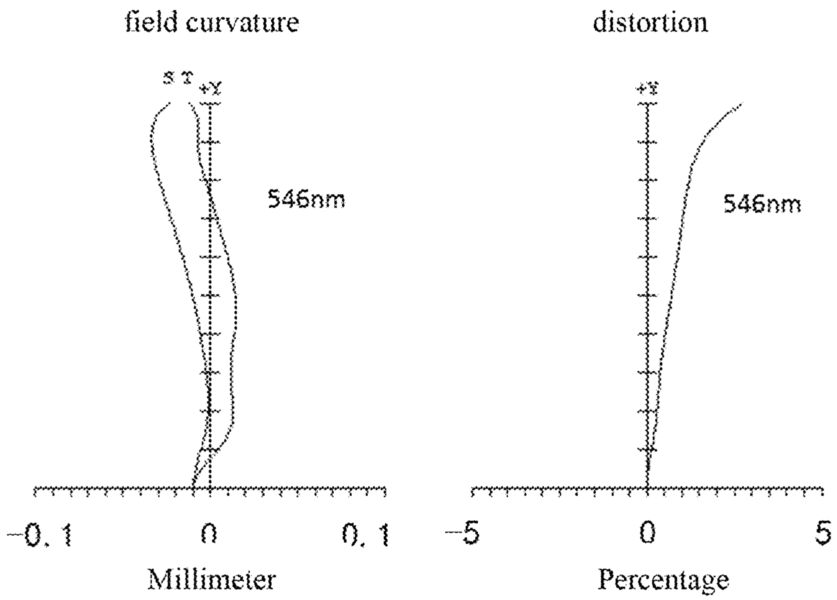
FIG. 54 is the diagram of field curvature and distortion of the camera lens shown in FIG. 49.

FIG. 50 is the MTF diagram of the camera lens LA in the embodiment 9; FIG. 51 is the predicted quality percentage of the camera lens LA in the embodiment 9; FNo of the camera lens LA in the embodiment 9 is 2.22. As shown in drawing 50-54, it is known that excellent optical properties and higher productivity are realized.

(Embodiment 10)

Figure 55:
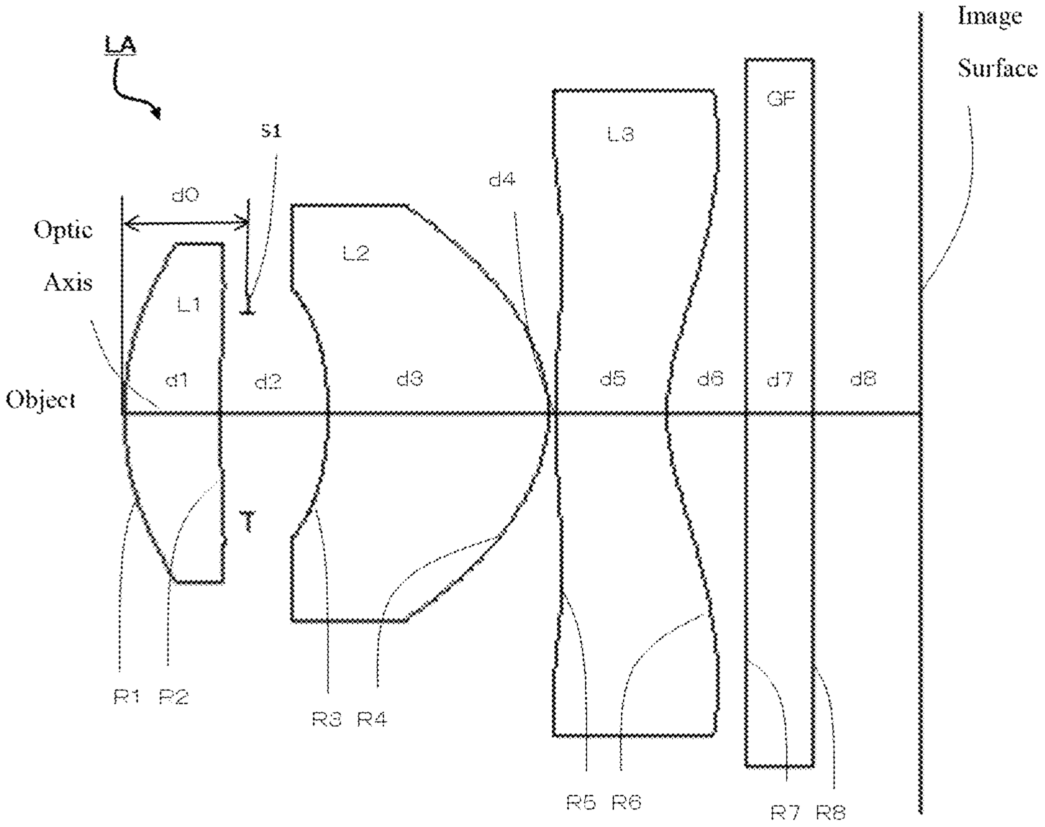
FIG. 55 is the composition diagram of the camera lens in the embodiment 10 of the present invention.

FIG. 55 is the structural diagram of the camera lens LA in the embodiment 10; The curvature radius of the object side and image, center thickness and the distance d between the lenses, refractive power nd and Abbe number v of the first lens, second lens and third lens of the camera lens LA in the embodiment 10 are shown in table 19. The cone constant k and aspherical coefficient are shown in table 20.

TABLE 19

| | R | | d | | nd | | vd |
|---|---|---|---|---|---|---|---|
| R1 | 1.32030 | d1 = | 0.431 | n1 | 1.509 | v1 | 56.5 |
| R2 | 7.22127 | d2 = | 0.120 | | | | |
| S1 | ∞ | d0 = | 0.361 | | | | |
| R3 | −1.44337 | d3 = | 0.990 | n2 | 1.552 | v2 | 54.2 |
| R4 | −0.67326 | d4 = | 0.030 | | | | |
| R5 | 2.91452 | d5 = | 0.502 | n3 | 1.642 | v3 | 22.4 |
| R6 | 0.85221 | d6 = | 0.350 | | | | |
| R7 | ∞ | d7 = | 0.300 | n4 | 1.523 | v4 | 54.5 |
| R8 | ∞ | d8 = | 0.490 | | | | |

TABLE 18

| | Cone Coefficient | Aspherical Coefficient | | | | | | |
|---|---|---|---|---|---|---|---|---|
| | k | A4 | A6 | A8 | A10 | A12 | A14 | A16 |
| R1 | −2.0839E−01 | 2.3983E−02 | 7.7553E−02 | −1.7869E−01 | 2.0377E−01 | 1.1418E−01 | −7.3450E−01 | 2.5126E−01 |
| R2 | 4.2313E+01 | −1.6252E−03 | −1.7084E−01 | 4.2575E−01 | −1.3211E+00 | 2.3528E−01 | 1.7960E+00 | −7.3316E−01 |
| R3 | 2.2000E+00 | −1.6326E−01 | −6.9371E−01 | −4.0622E−01 | 4.3085E+00 | −9.3649E+00 | 6.7591E−01 | −6.9038E−01 |
| R4 | −1.8444E+00 | −8.2189E−02 | −1.5791E−01 | −2.8354E−01 | 8.0566E−01 | −5.8135E−01 | −2.0261E−01 | 2.7897E−01 |
| R5 | −7.2703E+01 | −1.2244E−02 | −2.6200E−01 | 2.6836E−01 | 7.6924E−03 | −8.7651E−02 | 2.9302E−03 | 1.1214E−02 |
| R6 | −6.6855E+00 | −1.1758E−01 | 3.3019E−03 | 4.7954E−02 | −2.8943E−02 | 4.8520E−03 | 3.5012E−04 | −1.2183E−04 |

TABLE 20

| | Cone Coefficient | Aspherical Coefficient | | | | | | |
|---|---|---|---|---|---|---|---|---|
| | k | A4 | A5 | A8 | A10 | A12 | A14 | A16 |
| R1 | −2.8786E−01 | 2.3304E−02 | 6.2560E−03 | 4.1646E−02 | −1.7237E−01 | −5.3577E−02 | −3.0072E−01 | 0.0000E+00 |
| R2 | 3.5071E+01 | −1.9909E−02 | −1.8294E−01 | 2.8114E−01 | −1.1325E+00 | 2.3528E−01 | 1.7960E+00 | −7.3316E−01 |
| R3 | 1.8720E+00 | −1.6708E−01 | −6.1260E−01 | −8.8849E−01 | 5.7524E+00 | −9.3649E+00 | 6.7591E−01 | −6.9038E−01 |
| R4 | −1.5717E+00 | −1.0054E−01 | 1.9394E−01 | −4.5241E−01 | −3.8866E−01 | 1.7864E−01 | 1.6301E+00 | −1.2280E+00 |
| R5 | −9.0000E+01 | −1.0684E−01 | 1.3299E−01 | −2.1204E−01 | 1.6326E−01 | −4.2079E−02 | 5.4523E−04 | −6.3354E−04 |
| R6 | −6.5493E+00 | −1.3114E−01 | 7.4199E−02 | −3.9847E−02 | 1.5500E−02 | −2.8269E−03 | −1.9595E−04 | 1.0145E−04 |

The values of the embodiments 1-11 and the corresponding values of the parameters specified in the conditions (1)-(12) are listed in table 23.

As shown in table 23, the embodiment 10 meets the condition (1) to (12).

Figure 56:
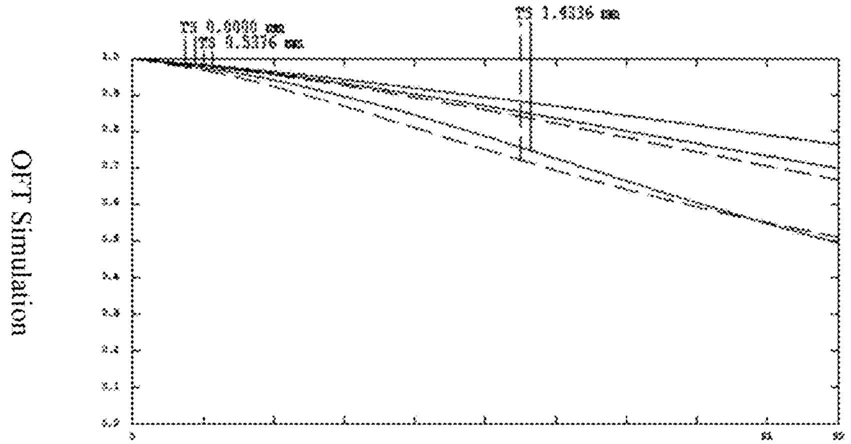
FIG. 56 is an MTF diagram of the camera lens shown in FIG. 55.
Figure 57:
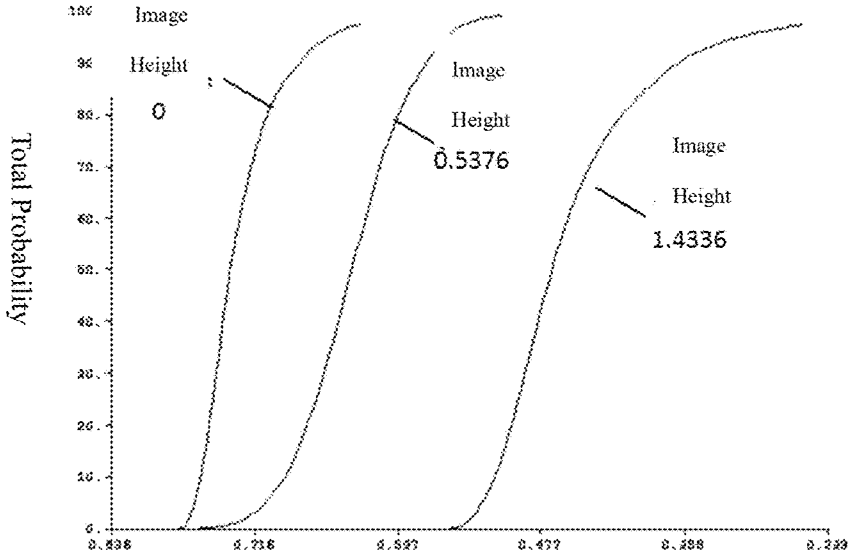
FIG. 57 is the diagram of predicted product quality percentage of the camera lens shown in FIG. 55.
Figure 58:
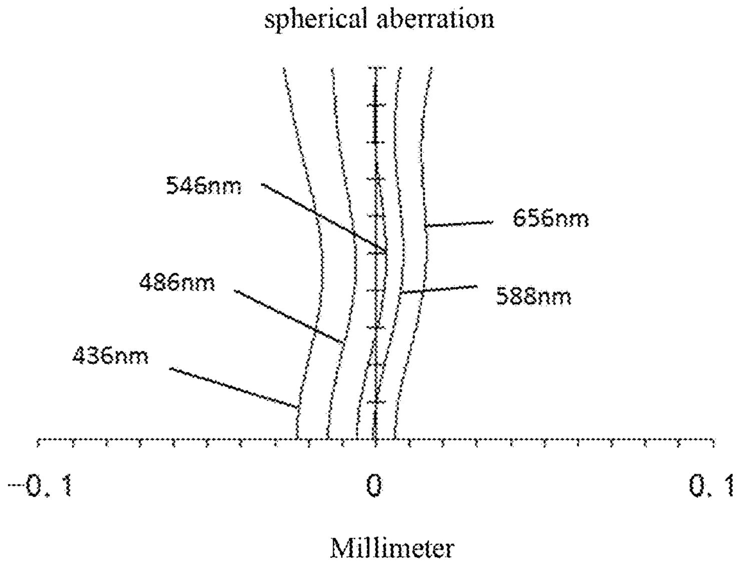
FIG. 58 is the diagram of the spherical aberration (axial chromatic aberration) of the camera lens shown in FIG. 55.
Figure 59:
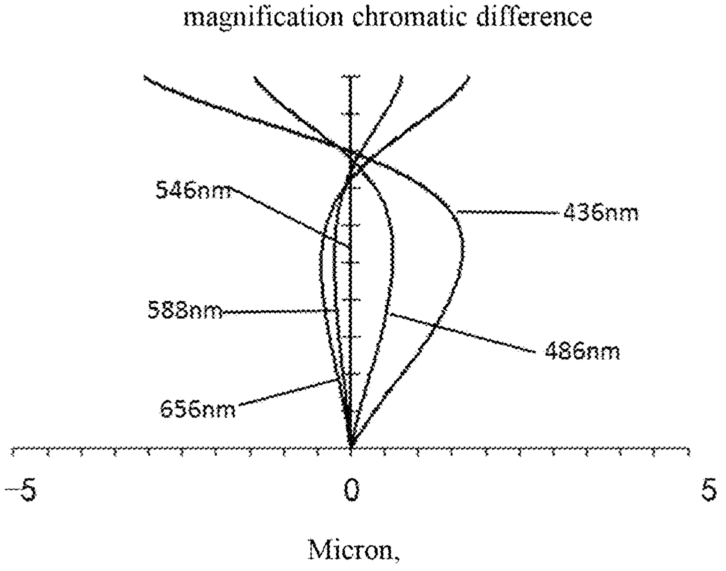
FIG. 59 is the diagram of magnification chromatic difference of the camera lens shown in FIG. 55.
Figure 60:
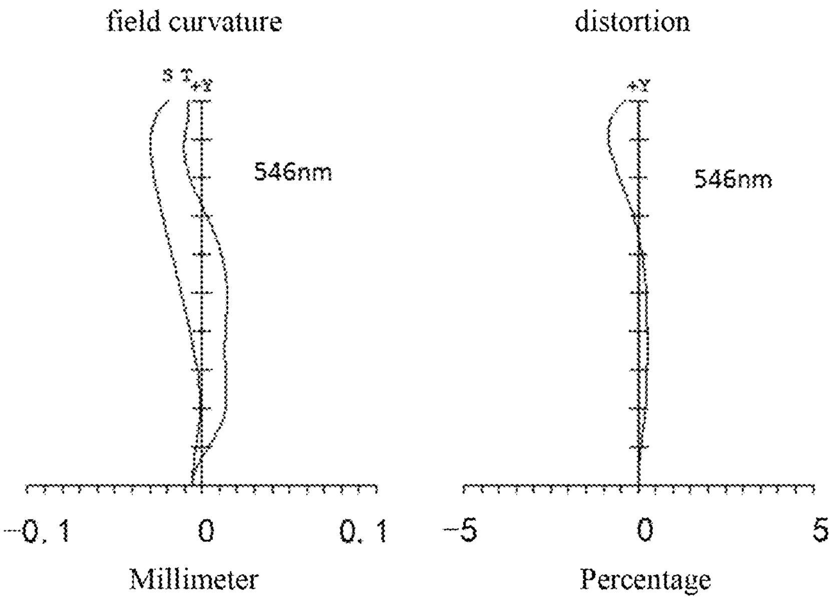
FIG. 60 is the diagram of field curvature and distortion of the camera lens shown in FIG. 55.

FIG. 56 is the MTF diagram of the camera lens LA in the embodiment 10; FIG. 57 is the predicted quality percentage of the camera lens LA in the embodiment 10; FNo of the camera lens LA in the embodiment 10 is 2.22. As shown in drawing 56-60, it is known that excellent optical properties and higher productivity are realized.

(Embodiment 11)

Figure 61:
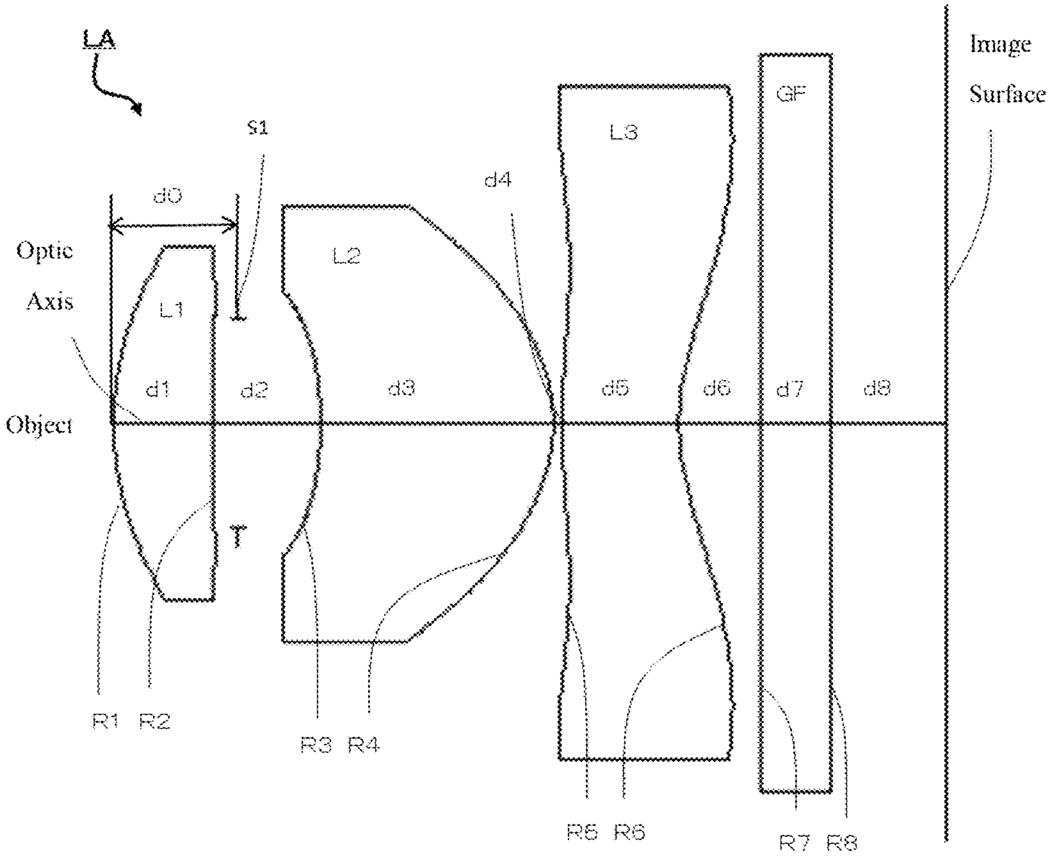
FIG. 61 is the composition diagram of the camera lens in the embodiment 11 of the present invention.

FIG. 61 is the structural diagram of the camera lens LA in the embodiment 11; The curvature radius of the object side and image, center thickness and the distance d between the lenses, refractive power nd and Abbe number v of the first lens, second lens and third lens of the camera lens LA in the embodiment 11 are shown in table 21. The cone constant k and aspherical coefficient are shown in table 22.

TABLE 21

| | R | | d | | nd | | vd |
|---|---|---|---|---|---|---|---|
| R1 | 1.35852 | d1 = | 0.420 | n1 | 1.509 | v1 | 56.5 |
| R2 | 7.89150 | d2 = | 0.113 | | | | |
| S1 | ∞ | d0 = | 0.351 | | | | |
| R3 | −1.53274 | d3 = | 1.000 | n2 | 1.582 | v2 | 56.2 |
| R4 | −0.71391 | d4 = | 0.038 | | | | |
| R5 | 2.86224 | d5 = | 0.501 | n3 | 1.642 | v3 | 22.4 |
| R6 | 0.87592 | d6 = | 0.350 | | | | |
| R7 | ∞ | d7 = | 0.300 | n4 | 1.523 | v4 | 54.5 |
| R8 | ∞ | d8 = | 0.496 | | | | |

TABLE 22

| | Cone Coefficient | Aspherical Coefficient | | | | | | |
|---|---|---|---|---|---|---|---|---|
| | k | A4 | A6 | A8 | A10 | A12 | A14 | A16 |
| R1 | −3.4098E−01 | −1.4203E−02 | 3.3904E−01 | −1.0085E+00 | 7.7531E−01 | −4.1941E−02 | 7.3450E−01 | −1.7769E+00 |
| R2 | 2.7056E+01 | −2.2528E−02 | −1.8839E−01 | 2.8922E−01 | −1.1386E+00 | 2.3528E−01 | 1.7960E+00 | −7.3316E−01 |
| R3 | 1.7140E+00 | −1.8971E−01 | −5.9791E−01 | 1.1179E+00 | −6.1137E+00 | 8.8205E+00 | 5.8361E−01 | 0.0000E+00 |
| R4 | −1.5087E+00 | −2.1083E−02 | −1.7413E−01 | −1.5985E−01 | 3.7364E−01 | −6.6342E−02 | −3.0254E−01 | 2.1799E−01 |
| R5 | −7.1290E+01 | −1.0963E−01 | 8.4099E−02 | −1.1657E−01 | 9.7055E−02 | −2.7583E−02 | 5.5802E−04 | −1.1359E−04 |
| R6 | −6.0747E+00 | −1.3774E−01 | 7.9606E−02 | −4.2100E−02 | 1.5904E−02 | −2.8005E−03 | −2.1839E−04 | 1.0462E−04 |

The values of the embodiments 1-11 and the corresponding values of the parameters specified in the conditions (1)-(12) are listed in table 23.

As shown in table 23, the embodiment 11 meets the conditions (1) to (12).

Figure 62:
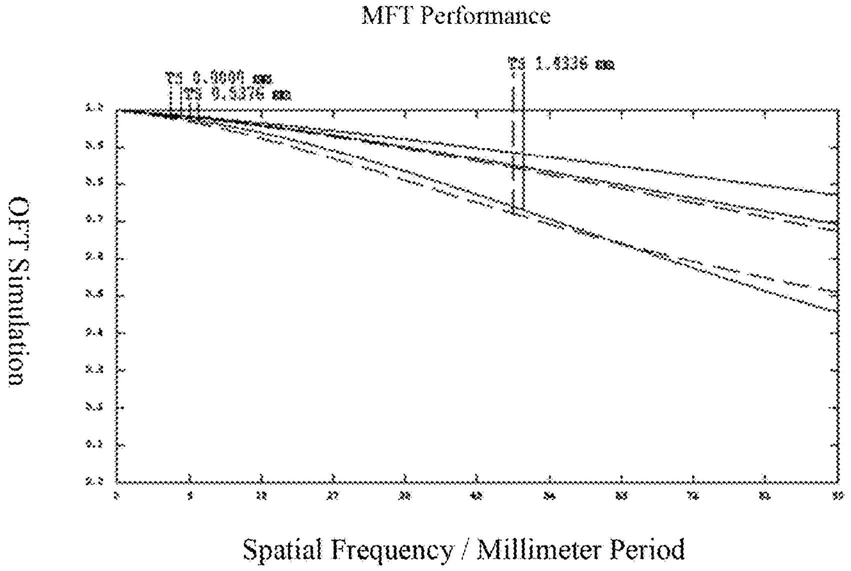
FIG. 62 is MTF diagram of the camera lens shown in FIG. 61.
Figure 63:
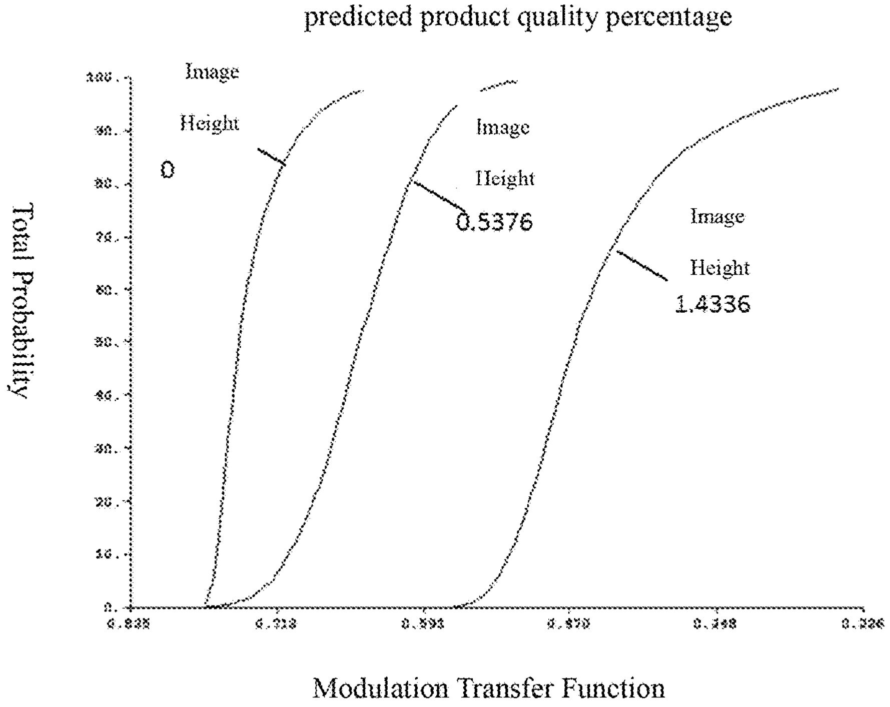
FIG. 63 is the diagram of predicted product quality percentage of the camera lens shown in FIG. 61.
Figure 64:
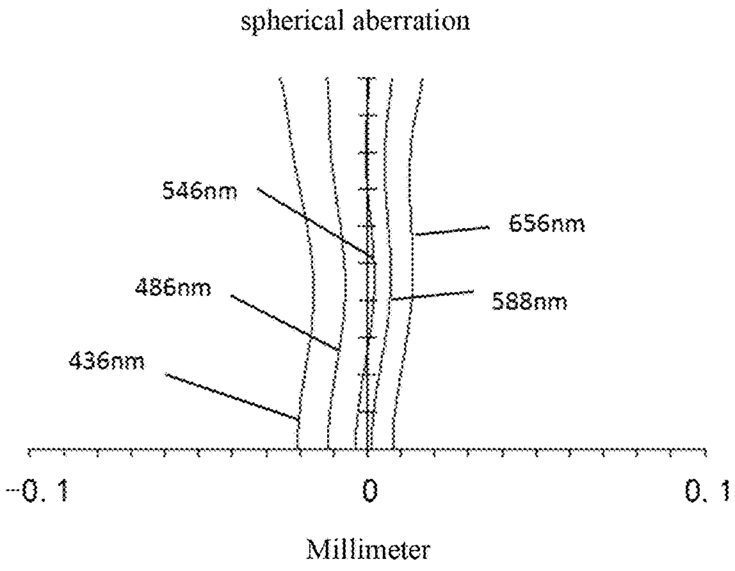
FIG. 64 is the diagram of the spherical aberration (axial chromatic aberration) of the camera lens shown in FIG. 61.
Figure 65:
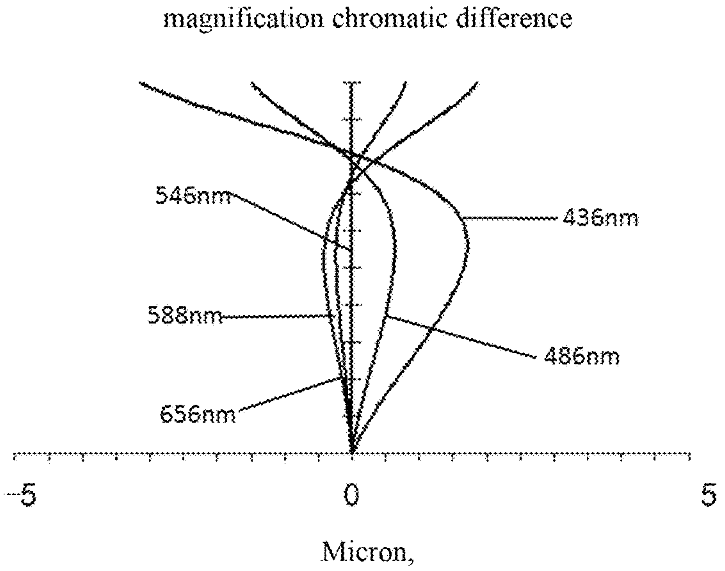
FIG. 65 is the diagram of magnification chromatic difference of the camera lens shown in FIG. 61.
Figure 66:
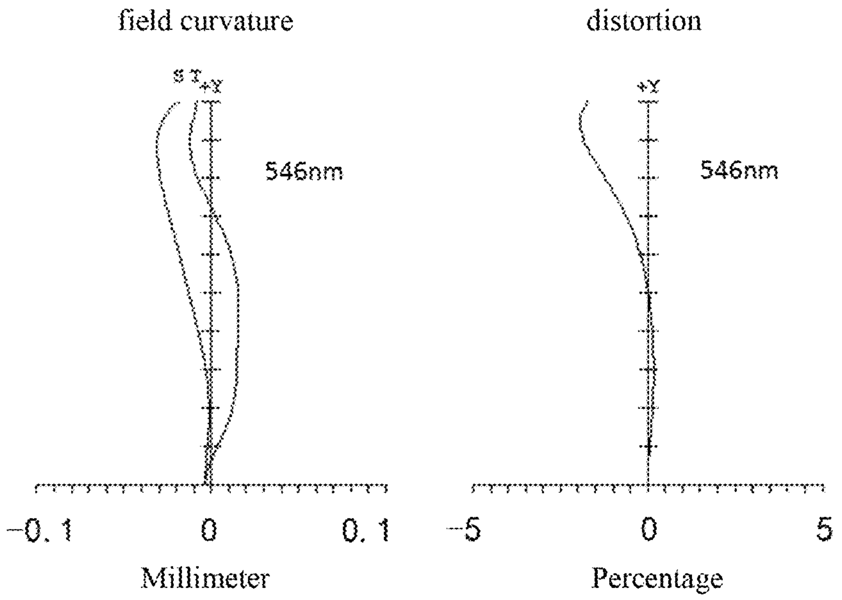
FIG. 66 is the diagram of field curvature and distortion of the camera lens shown in FIG. 61.

FIG. 62 is the MTF diagram of the camera lens LA in the embodiment 10; FIG. 63 is the predicted quality percentage of the camera lens LA in the embodiment 10; FNo of the camera lens LA in the embodiment 10 is 2.22. As shown in drawing 62-66, it is known that excellent optical properties and higher productivity are realized.

The values of the embodiments and the corresponding values of the parameters specified in condition (1) to (12) are listed in table 23. In addition, the unit shown in table 23 are respectively f(mm), f1(mm), f2(mm), f3(mm), TTL(mm), IH(mm).

TABLE 23

| | E1 | E2 | E3 | E4 | E5 | E6 | E7 | E8 | E9 | E10 | E11 | Condition |
|---|---|---|---|---|---|---|---|---|---|---|---|---|
| f/f1 | 0.75 | 0.74 | 0.80 | 0.76 | 0.76 | 0.78 | 0.77 | 0.77 | 0.75 | 0.74 | 0.71 | (1) |
| d1/f | 0.19 | 0.18 | 0.18 | 0.18 | 0.18 | 0.19 | 0.19 | 0.18 | 0.20 | 0.19 | 0.19 | (2) |
| (R1 + R2)/(R1 − R2) | −1.42 | −1.45 | −1.38 | −1.40 | −1.42 | −1.17 | −1.46 | −1.38 | −1.51 | −1.45 | −1.42 | (3) |
| f/f3 | −1.34 | −1.29 | −1.27 | −1.26 | −1.28 | −1.24 | −1.22 | −1.29 | −1.30 | −1.11 | −1.03 | (4) |

TABLE 23-continued

| | E1 | E2 | E3 | E4 | E5 | E6 | E7 | E8 | E9 | E10 | E11 | Condition |
|---|---|---|---|---|---|---|---|---|---|---|---|---|
| (R5 + R6)/(R5 − R6) | 1.53 | 1.81 | 1.85 | 2.05 | 1.92 | 1.84 | 1.83 | 2.10 | 1.91 | 1.83 | 1.88 | (5) |
| f/f2 | 1.64 | 1.63 | 1.57 | 1.57 | 1.59 | 1.57 | 1.57 | 1.60 | 1.65 | 1.47 | 1.42 | (6) |
| (R3 + R4)/(R3 − R4) | 2.62 | 2.43 | 2.64 | 2.44 | 2.48 | 2.66 | 2.67 | 2.41 | 2.42 | 2.75 | 2.74 | (7) |
| d3/f | 0.44 | 0.43 | 0.43 | 0.43 | 0.43 | 0.43 | 0.43 | 0.43 | 0.43 | 0.43 | 0.44 | (8) |
| d3/d5 | 1.84 | 2.24 | 2.24 | 2.38 | 2.29 | 2.20 | 2.23 | 2.52 | 2.36 | 1.97 | 2.00 | (9) |
| R2/f | 3.29 | 3.13 | 3.42 | 3.41 | 3.26 | 2.85 | 2.96 | 3.55 | 2.73 | 3.14 | 3.51 | (10) |
| d2/d4 | 15.05 | 17.33 | 16.73 | 16.83 | 16.96 | 17.08 | 16.51 | 17.11 | 17.14 | 16.02 | 15.48 | (11) |
| v1/v2 | 1.08 | 1.08 | 1.08 | 1.08 | 1.08 | 1.08 | 1.08 | 1.17 | 1.13 | 1.04 | 1.01 | (12) |
| Fno | 2.18 | 2.24 | 2.28 | 2.27 | 2.27 | 2.25 | 2.23 | 2.28 | 2.22 | 2.22 | 2.19 | |
| f | 2.26 | 2.33 | 2.35 | 2.35 | 2.35 | 2.35 | 2.33 | 2.35 | 2.35 | 2.30 | 2.25 | |
| f1 | 3.01 | 3.16 | 2.95 | 3.10 | 3.08 | 3.03 | 3.03 | 3.07 | 3.15 | 3.09 | 3.15 | |
| f2 | 1.38 | 1.44 | 1.50 | 1.50 | 1.48 | 1.50 | 1.48 | 1.47 | 1.43 | 1.57 | 1.58 | |
| f3 | −1.69 | −1.81 | −1.85 | −1.86 | −1.83 | −1.90 | −1.91 | −1.82 | −1.81 | −2.08 | −2.19 | |
| TTL | 3.58 | 3.57 | 3.53 | 3.53 | 3.54 | 3.57 | 3.57 | 3.51 | 3.57 | 3.57 | 3.56 | |
| IH | 1.792 | 1.792 | 1.792 | 1.792 | 1.792 | 1.792 | 1.792 | 1.792 | 1.792 | 1.792 | 1.792 | |

Note:
E = Embodiment

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera lens comprising, from the object side to the image side:

a first lens with positive refractive power, whose object side surface and image side surface are both aspheric surfaces;

an aperture;

a second lens with positive refractive power, whose object side surface and image side surface are both aspheric surfaces;

a third lens with negative refractive power, whose object side surface and image side surface are both aspheric surfaces; wherein the object side surface of the first lens is convex and the image side surface is concave, the camera lens satisfies the following conditions:

$$0.6<f/f1<1.0 \quad (1);$$

$$-1.6<(R1+R2)/(R1-R2)<-1.2 \quad (2);$$

$$0.15<d1/f<0.2 \quad (3);$$

$$-1.5<f/f3<-1 \quad (4);$$

$$1.3<(R5+R6)/(R5-R6)<2.1 \quad (5);$$

$$1.0<f/f2<2.0 \quad (6);$$

$$2.2<(R3+R4)/(R3-R4)<2.8 \quad (7);$$

where, f is the focal distance of the camera lens;

f1 is the focal distance of the first lens;

f2 is the focal distance of the second lens;

R1 is the object side curvature radius of the first lens;

R2 is the image side curvature radius of the first lens;

d1 is the center thickness of the first lens;

f3 is the focal distance of the third lens;

R3 is the object side curvature radius of the second lens;

R4 is the image side curvature radius of the second lens;

R5 is the object side curvature radius of the third lens;

R6 is the image side curvature radius of the third lens.

2. The camera lens according to claim 1 further satisfying the following condition:

$$0.2<d3/f<0.5 \quad (8);$$

$$1.5<d3/d5<3.5 \quad (9);$$

where, d3 is the center thickness of the second lens;

d5 is the center thickness of the third lens.

3. The camera lens according to claim 2, wherein the third lens is made of plastic and has at least one inflexion point.

4. The camera lens according to claim 3 further satisfying the following condition:

$$10<d2/d4<20 \quad (10);$$

$$2.5<R2/f<4.0 \quad (11);$$

where d2 is the axial distance between the image side surface of the first lens and the object side surface of the second lens;

d4 is the axial distance between the image side surface of the second lens and the object side surface of the third lens.

5. The camera lens according to claim 4 further satisfying the following condition:

$$1.0<v1/v2<1.2 \quad (12);$$

where, v1 is the abbe number of the first lens;

v2 is the abbe number of the second lens.

* * * * *